US012638292B2

(12) United States Patent
Felice

(10) Patent No.: US 12,638,292 B2
(45) Date of Patent: May 26, 2026

(54) SYSTEMS AND METHODS FOR STABILIZING MAGNETIC FIELD OF INERTIAL MEASUREMENT UNIT

(71) Applicant: Spotify AB, Stockholm (SE)

(72) Inventor: Michael J. Felice, Seattle, WA (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/120,690

(22) Filed: Mar. 13, 2023

(65) Prior Publication Data

US 2023/0213342 A1      Jul. 6, 2023

Related U.S. Application Data

(63) Continuation of application No. 17/127,307, filed on Dec. 18, 2020, now Pat. No. 11,604,067.

(60) Provisional application No. 62/950,459, filed on Dec. 19, 2019.

(51) Int. Cl.
*G01C 21/16*          (2006.01)
(52) U.S. Cl.
CPC ....... *G01C 21/183* (2020.08); *G01C 21/1654* (2020.08)
(58) Field of Classification Search
None
See application file for complete search history.

(56) References Cited

U.S. PATENT DOCUMENTS

| | | | |
|---|---|---|---|
| 8,239,162 B2 | 8/2012 | Tanenhaus | |
| 8,275,544 B1 | 9/2012 | Wells et al. | |
| 10,068,316 B1 | 9/2018 | Holzer et al. | |
| 10,095,942 B2 | 10/2018 | Mentese et al. | |
| 10,271,770 B2 | 4/2019 | Pathak et al. | |
| 10,356,395 B2 | 7/2019 | Holzer et al. | |
| 10,728,527 B2 | 7/2020 | Holzer et al. | |
| 11,036,228 B2 | 6/2021 | Koyama et al. | |
| 2002/0021245 A1* | 2/2002 | Lin | G01S 19/35 |
| | | | 701/472 |
| 2011/0241656 A1* | 10/2011 | Piemonte | G01C 21/20 |
| | | | 324/207.11 |
| 2013/0018582 A1* | 1/2013 | Miller | G01C 17/38 |
| | | | 701/501 |
| 2013/0150076 A1* | 6/2013 | Kim | G01C 21/1654 |
| | | | 455/456.1 |
| 2016/0286009 A1* | 9/2016 | Edge | H04W 4/029 |
| 2020/0003357 A1 | 1/2020 | Su et al. | |

* cited by examiner

*Primary Examiner* — Mark A Shabman
(74) *Attorney, Agent, or Firm* — Morgan, Lewis & Bockius LLP

(57)          ABSTRACT

A method for stabilizing a magnetic field of an inertial measurement unit (IMU), is provided that includes initializing accelerometer and gyroscope (AG) heading data for the IMU and initializing accelerometer, gyroscope and magnetometer (AGM) heading data for the IMU. Determining whether a tracking state exists and completing processing of the AG heading data and the AGM heading data if the tracking state does not exist. Calculating a magnetic field error if the tracking state exists.

20 Claims, 20 Drawing Sheets

SYSTEMS AND METHODS FOR STABILIZING MAGNETIC FIELD OF INERTIAL MEASUREMENT UNIT

RELATED APPLICATIONS

The present application is a continuation of U.S. patent application Ser. No. 17/127,307 filed Dec. 18, 2020, which claims benefit of and priority to U.S. Provisional Patent Application No. 62/950,459, filed Dec. 19, 2019, each of which is hereby incorporated by reference for all purposes as if set forth herein in its entirety.

TECHNICAL FIELD

The present invention relates to the field of inertial measurement units (IMUs), and more specifically to IMUs that are configured to provide more reliable magnetometer-based heading data than conventional IMUs, and methods of managing IMUs to yield output signals with more reliable magnetic-based heading data than conventional IMUs.

BACKGROUND

An Inertial Measurement Unit (IMU) is a self-contained system of sensors used to discern relative positional and rotational changes to the system. Because the measurements are relative, errors generated by the sensors accumulate, and reduce the reliability of readings over long-term use. This time-dependent error accumulation is known as drift.

One of the reasons magnetometers were incorporated into some IMUs was to use magnetic North to counteract drift; however, in many applications, the magnetic field is inconsistent, making use of the magnetometer for this purpose unreliable. The present disclosure provides a system and method for processing the sensors output of an IMU that can adjust for these inconsistencies, to make the magnetometer readings more reliable.

IMUs can be constructed with one or more sensors, such as accelerometers, gyroscopes and magnetometers, and each type of sensor measures different external forces on the IMU. An accelerometer measures normal forces along the axes that the sensor is aligned with (typically 3 orthogonal axes for translation into directions corresponding to up/down, left/right, forward/backward). The normal forces are accelerations that can be mathematically integrated once to compute velocities and integrated twice to determine positional changes over time. When the accelerometer is stationary, it can accurately describe the force of gravity on the system when that is the only external force acting on the sensor.

A gyroscope measures rotational changes around the axes that the sensor is aligned to. If the gyroscope measures angular velocity, that measurement can be integrated to determine angular changes over time. How an IMU is oriented in relation to a device can be used to determine the facing direction (heading) of the device or IMU.

A magnetometer measures magnetic field. A magnetic field is usually present because Earth has a magnetic field, so this sensor can be used to find a reference direction in the same manner that a compass does. When external magnetic fields are not changing, the magnetometer's readings can be used to ensure that rotational measurements are not drifting, because the source direction of the external magnetic field (e.g.: magnetic North) does not usually significantly change. The IMU sensors' measurements can then be processed with "fusion software," which not only does the mathematical integration to get meaningful positional and angular information about the system's orientation changes but which also tries to reduce error. There are many different filters and techniques that are used to reduce error in the sensor readings.

SUMMARY OF THE INVENTION

A method for stabilizing a magnetic field of an inertial measurement unit (IMU) is provided that includes initializing accelerometer and gyroscope (AG) heading data for the IMU and initializing accelerometer, gyroscope and magnetometer (AGM) heading data for the IMU. It is then determined whether a tracking state exists, and processing of the AG heading data and the AGM heading data is completed if the tracking state does not exist. A magnetic field error is calculated if the tracking state exists.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE EXAMPLE EMBODIMENTS

General Considerations

Figure 1:
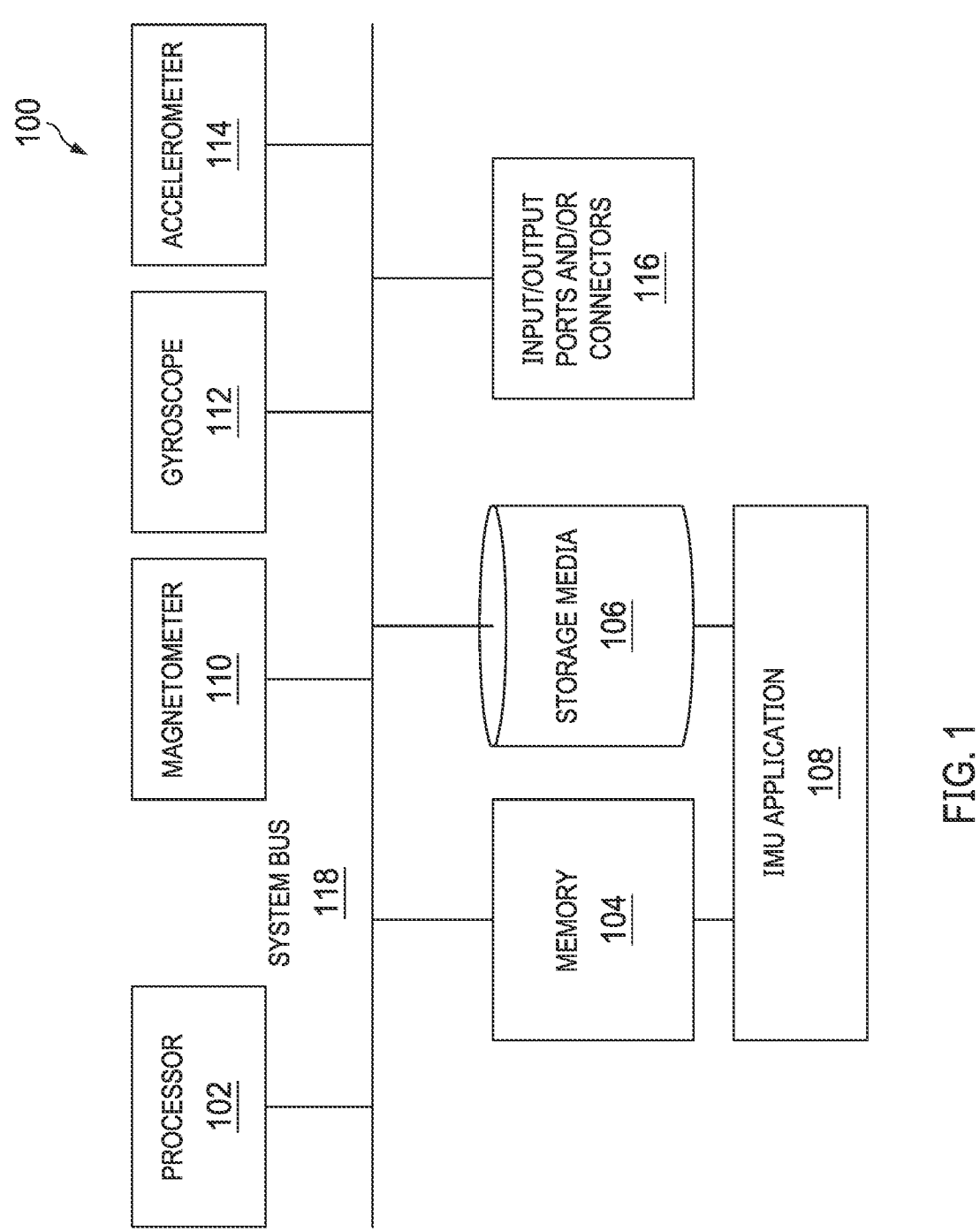
FIG. 1 is schematic block diagram of an inertial measurement unit (IMU), in accordance with an example embodiment of the present disclosure.

In the following description, it should be understood that the present disclosure is not limited to the particular example structures, process steps, or material disclosed herein, but is extended to equivalents thereof as would be recognized by those ordinary skilled in the relevant arts. It should also be understood that terminology employed herein is used for the purpose of describing particular embodiments only and is not intended to be limiting. Like parts are marked throughout the specification and drawings with the same reference numerals. The drawing figures may or may not be to scale and certain components can be shown in generalized or schematic form and identified by commercial designations in the interest of clarity and conciseness.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "evaluate" to describe the disclosed technology. These terms are high-level abstractions of the actual operations that are performed. The actual operations that correspond to these terms may vary depending on the particular implementation and are readily discernible by one of ordinary skill in the art.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a disclosed technique or tool is not the only way to solve such problems.

Magnetometer Error

There are many things that destabilize a magnetometer's readings. Ferrous materials, an abundance of metal, and electrical circuits can all affect the results of a magnetometer, skewing the magnetometer's identification of magnetic North. Also, the magnetic North of Earth is dependent on location, so there is no way to calibrate a magnetometer to help identify magnetic North for internationally produced IMUs. These are only a few reasons why an IMU is dependent on the gyroscope to determine rotational changes and the magnetometer (if used at all) is only used to help reduce drift in fusion software or for something simple like a compass application.

In a modern, technologically-abundant world, there are many magnetic field disruptions, and traveling long distances is common. This means that a magnetometer may need to recalibrate itself as it reads magnetic field measurements, called dynamic calibration. To fully dynamically calibrate a magnetometer, the IMU can be manually rotated around three orthogonal axes. Unfortunately, movement often degrades magnetometer calibration over time due to changing magnetic fields and the manual process is cumbersome, so the magnetometer is likely not well calibrated, especially over long-term use. As the magnetometer's calibration worsens, any errors in the reported magnetometer measurements increases.

In contrast to magnetometer error affecting the detection of magnetic North, gravity normally points down, relative to the functional orientation of the IMU. The accelerometer can be used to measure and track gravity, which can then be used to help determine a frame of reference for the IMU. This reference frame can help identify the pitch or tilt of the system, which can be used to inverse the IMU's orientation when reporting the magnetic field. This inversion is necessary, so that magnetic North does not change as the IMU rotates. Because the gravity data is based on the accelerometer's reported gravity, this data value is not affected by drift.

Mitigating Magnetometer Error

Identifying a magnetic field can be beneficial for several reasons, including mitigating IMU drift. For example, magnetometers are currently used in navigation tools to assist with navigation underground or in cityscapes where satellite communications are not consistent.

There are several things that are currently done to reduce magnetic field error. This includes but is not limited to the following:

Improving magnetometer, gyroscope, and accelerometer accuracy directly reduces the measurement errors reported by the IMU.

Incorporating a very accurate, sensitive clock in the IMU reduces error in the fusion software calculations.

Fusion software is continually adapting to reduce error. There are many engineers dedicated to developing techniques and filters to improve IMU output.

IMU calibration techniques can affect magnetic field accuracy. IMU producers keep many IMU calibration techniques as trade secrets to gain competitive advantage over other IMU manufacturers.

Rerouting magnetic field lines as not to be detected by the magnetometer through magnetic shielding.

Building electric circuits with magnetic field in mind when positioning an IMU on a board can reduce magnetic field error.

Introduction

FIG. 1 is schematic block diagram of an inertial measurement unit (IMU) that is configured to implement the example embodiments of the present disclosure. The illustrated IMU 100 includes a variety of optional hardware and software components. It should be understood that each component in the IMU 100 can directly or indirectly communicate with any other suitable component of the IMU, although not all connections are shown, for ease of illustration. The IMU can be incorporated into or used with a variety of other systems, such as a virtual reality headset, a tablet computer, a smart phone, a laptop computer, or other suitable commercial or consumer device.

The IMU 100 includes a processor 102, a non-transitory memory 104, and a storage media 106. The processor 102 is configured to load code instructions from a memory device associated with processor 102 and to execute the code instructions, such as by using an arithmetic logic unit, in order to perform the operations and to provide the functionality described herein, to manage request flow and address mappings, to perform calculations and generate commands and to perform other suitable functions. The processor 102 can be configured to monitor and control the operation of the components in the computing machine 102. The processor 102 can be a general-purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 102 can be a single processing unit, multiple processing units, a single processing core, multiple processing cores, special purpose processing cores, co-processors, or any combination thereof. According to certain embodiments, the processor 102 along with other components of IMU 100 can be a virtualized computing machine executing within one or more other computing machines.

The non-transitory memory 104 can include non-volatile memories such as read-only memory ("ROM"), programmable read-only memory ("PROM"), erasable programmable read-only memory ("EPROM"), flash memory, or any other device capable of storing program instructions or data with or without applied power. The non-transitory memory 104 can also include volatile memories such as random access memory ("RAM"), static random access memory ("SRAM"), dynamic random access memory ("DRAM"), and synchronous dynamic random access memory ("SDRAM"). Other types of RAM can also or alternatively be used to implement the non-transitory memory 104. The non-transitory memory 104 can be implemented using a single memory module or multiple memory modules. While the non-transitory memory 104 is depicted as being part of IMU 100, one skilled in the art will recognize that the non-transitory memory 104 can be separate from the IMU 100 without departing from the scope of the subject technology. It should also be appreciated that the non-transitory memory 104 can include, or operate in conjunction with, a non-volatile storage device such as the storage media 106.

The storage media 106 can be a non-volatile memory device that stores one or more operating systems, application programs and program modules such as module 2050, data, or other suitable digitally-encoded information. The storage media 106 can be part of, or connected to the IMU 100.

The IMU 100 includes an IMU application 108 that comprises one or more hardware or software elements configured to facilitate the IMU 100 with performing the various methods and processing functions presented herein. The IMU application 108 can include one or more sequences of instructions stored as software or firmware in association with one or more of the non-transitory memory 104, the storage media 106, or other suitable data memory devices.

The IMU 100 further includes a magnetometer 110 that supplies magnetometer readings, a gyroscope 112 that supplies gyroscopic readings, and an accelerometer 114 that supplies accelerometer readings. The IMU 100 can further include input/output ports and/or connector 116, which may be any suitable connector to another component or system. The IMU 100 may be a component in a larger system, and the input/output ports and/or connector 116 can serve to provide communications to and/or from the IMU 100.

The IMU 100 employs a system bus 118 or other communication mechanism for communicating information between different components of the IMU 100. In some aspects, various components can be located outside the IMU 100, where communication between components of the IMU 100 can be accomplished via a hardwire or wireless connection.

There are at least two separate relevant headings that can be retrieved from the IMU 100 when stabilizing magnetometer readings. The first heading is called AG heading, which refers to the heading that is determined using the accelerometer 114 and the gyroscope 112 only; the AG heading can experience drift, where the AG reading can start operation with an accurate value and can degrade over time if drift is not removed from the AG heading. The second heading is called AGM heading, which refers to the magnetic field heading relative to an initial reading of magnetic North obtained from the accelerometer 114, the gyroscope 112 and the magnetometer 110. The AGM heading is not affected by drift, but it is very sensitive to magnetic field disruptions. To stabilize magnetometer readings (the AGM heading), drift is computed at different points in the process. How drift is computed is not discussed in this document, and suitable processes for computing drift can be used.

The processes illustrated in the present disclosure refer to unwanted magnetic field changes in the environment that the IMU 100 is in as magnetic field disruptions. These processes take the approach that an environment's steady magnetic state can be determined enough to identify and adjust when magnetic field disruptions are encountered. The adjustments made in this way can be used to report a more accurate drift in a magnetically complicated environment, which in turn improves the accuracy of a magnetometer's representation of magnetic North for that environment. In the present disclosure, the accurate/actual drift of the system that is calculated is referred to as current drift.

An Overview

Figure 2:
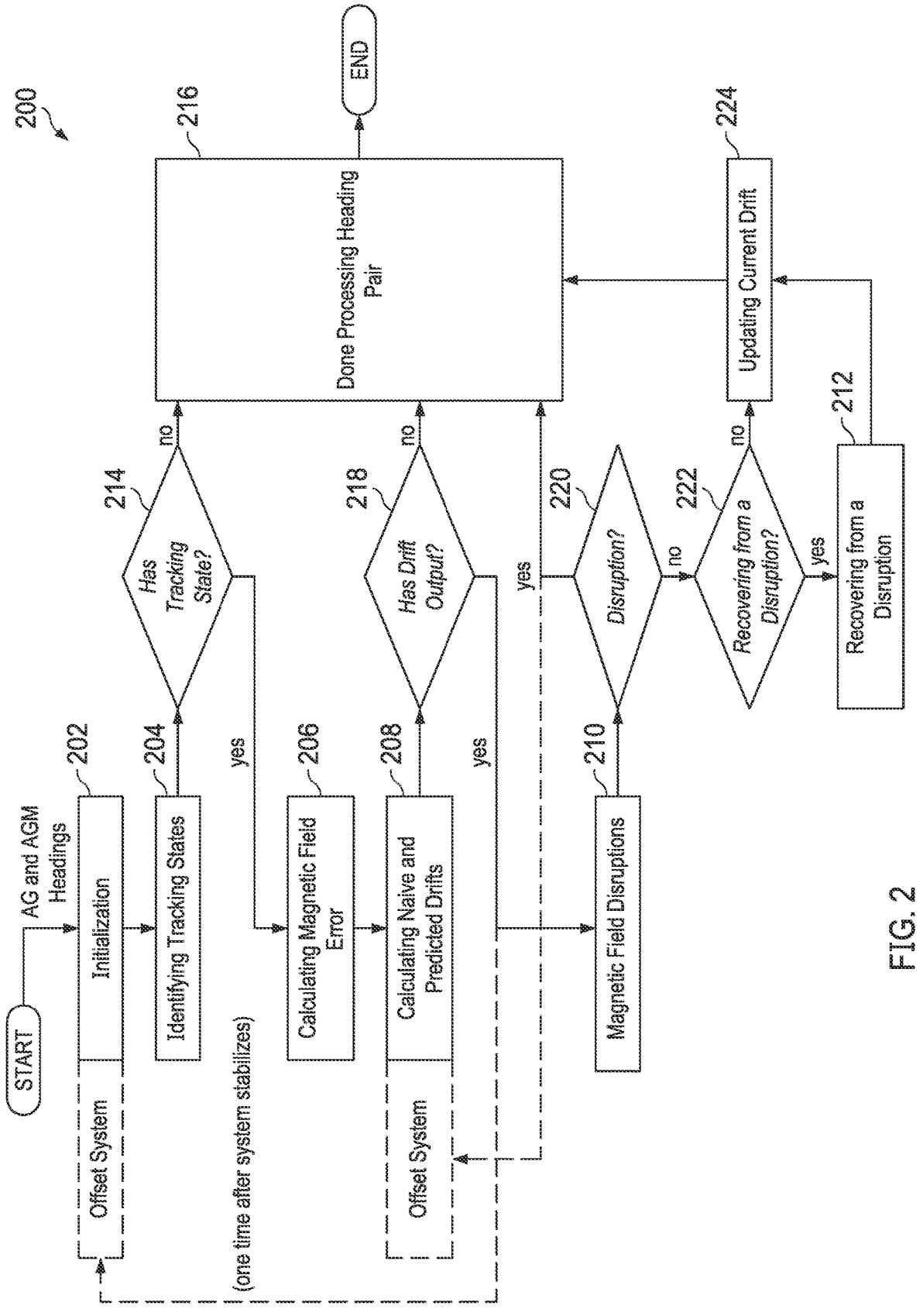
FIG. 2 is a flowchart of an algorithmic process which can be implemented in a system that processes AG and AGM headings retrieved from an IMU, according to an example embodiment of the present disclosure.

FIG. 2 is a flowchart of an algorithmic process 200 which can be implemented in hardware or a suitable combination of hardware and software, such as in a system that processes AG and AGM headings retrieved from the IMU 100, according to an example embodiment of the present disclosure. FIG. 2 shows how the different subsystems can interact together to refine drift as magnetic field disruptions are identified and removed and magnetic field error is calculated and removed from the system. In a system implementing algorithmic process 200, data computations and decisions can be made based on the AG heading and AGM heading, the state of the system, earlier collections of other AG and AGM heading pairs over time or other suitable data. Each pair of headings can have a time stamp identifying when the AG and AGM headings were collected and can be used to determine how many samples need to be gathered to make assessments throughout the process. The number of samples needed for accuracy can depend on the frequency that AG and AGM headings are reported and the accuracy of the IMU 100; the sample counts can be tested against the overall reported accuracy and tuned to improve the accuracy of individual subsystems.

Initially, AG and AGM headings received from the IMU can be processed at step 202 initialization. Specifically, AG and AGM headings can be initialized at 102 to eliminate as much error as possible from the overall system, to make sure that the heading pairs start in the same direction. Tracking states can be identified at 204, where the state of the IMU is defined using the AG and AGM heading pair. If tracking states are identified (214), magnetic field error can be calculated at 206. Otherwise, AG and AGM heading pairs are clone processing (216). Naïve and predicted drifts can be calculated at 208. If there is drift output from 208 (218), the drift can be used to offset the system (202), and magnetic field disruptions can be determined at 210. Otherwise, AG and AGM heading pairs are done processing (216). If disruption is found (220), the disruption can be used to offset the system (208) and the AG and AGM heading pairs are done processing (216). If no disruption is found (220), and if the system is recovering from a magnetic field disruption (222), the system recovers from a disruption (212), otherwise current drift is updated (224). Then AG and AGM heading pairs are done processing (216).

Initialization

Figure 3:
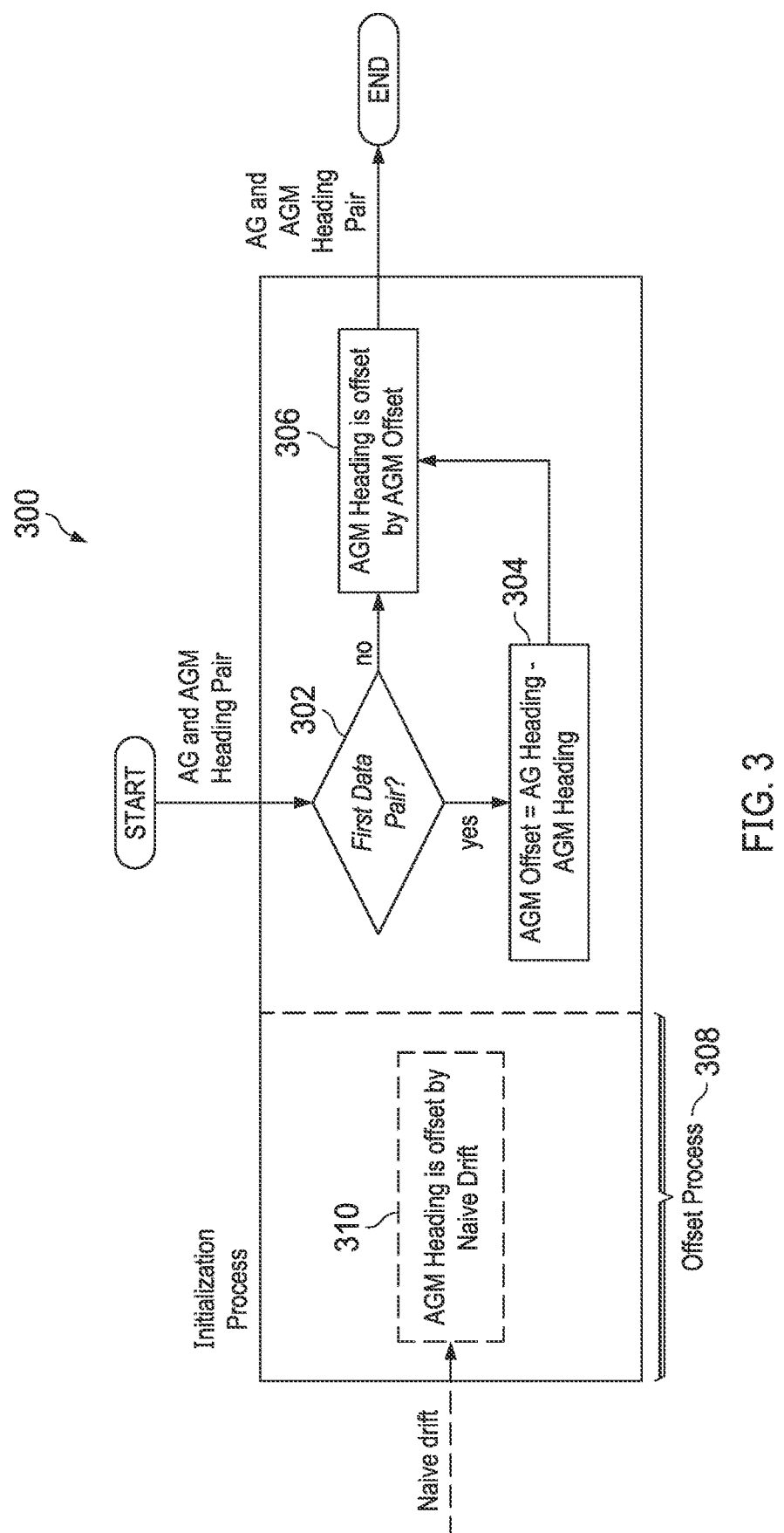
FIG. 3 is a flowchart of an algorithmic process which can be implemented in a system that initializes AG and AGM headings retrieved from an IMU, according to an example embodiment of the present disclosure.

FIG. 3 is a flowchart of an algorithmic process 300 which can be implemented in hardware or a suitable combination of hardware and software, such as a system that initializes the AG and AGM headings retrieved from an IMU, according to an example embodiment of the present disclosure. If the AG and AGM heading pair is the first data pair (302), AGM offset can be calculated at 304, which is equal to AG heading minus AGM heading. Otherwise, AGM heading can be offset by AGM offset at 306. This process can be used to ensure that heading pairs are starting at the same baseline.

Algorithmic process 300 can optionally include an offset process 308 that uses naïve drift to offset the data. In the event that drift is calculated and accumulated for a defined period of time, naïve drift can be used to offset the AGM heading at 310. This process is a one-time offset that can be used when the first naïve drift is calculated and is not updated again in the system. The AGM heading can be modified before it is passed with the AG heading for further processing.

Initialization can be performed using the first pair of AG and AGM headings by offsetting AGM headings to eliminate as much error from the overall system as possible. Part of this process is that the AG and AGM headings will likely not be the same because they are independent systems (the first based on initial orientation and the second based on the current understanding of magnetic North). Process 300 can offset the AGM heading to ensure that the heading pairs are starting at the same baseline.

Drift can subsequently be calculated and accumulated for a defined period of time. This drift represents a combination of a larger set of AG and AGM heading pairs, which evaluates the centeredness of the system. Since drift accumulates slowly, the earlier the drift calculation is used, the more closely this value represents the centeredness of the system. This (naïve drive) can be used to offset the AGM headings, where the AG and AGM headings can be represented as pointing in the same heading direction when the process started.

Identifying Tracking States

The AG and AGM heading pair can be processed in different ways depending on the state of the IMU, which allows the system to determine how accurate the AG and AGM headings each are. For example, when an IMU is stationary, the AG heading should not change. If the IMU is stationary and the AG heading does not change, then it does not matter what changes in the AGM headings because they are all either error reported in the system or magnetic field disruptions.

Figure 4A:
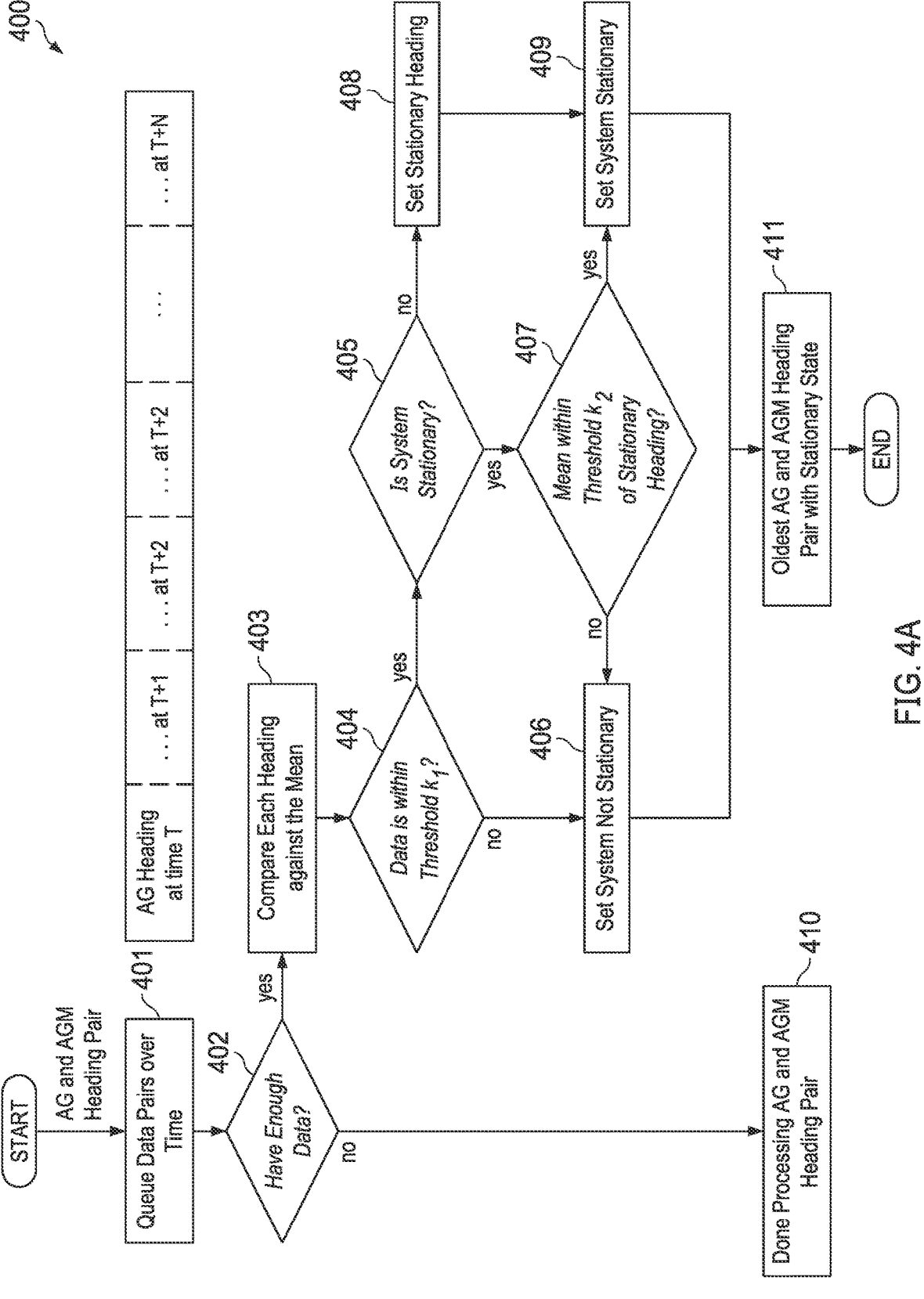
FIG. 4A is a flowchart of an algorithmic process which can be implemented in a system that identifies a stationary state, according to an example embodiment of the present disclosure.

FIG. 4A is a flowchart of an algorithmic process 400 of the present disclosure which may be implemented in hardware or a suitable combination of hardware and software, such as a system that identifies a stationary state, according to an example embodiment of the present disclosure. AG and AGM heading pairs are queued over time at 401, for intervals from 1 to N. If queue data pairs are enough (402), each heading is compared against the mean of the queued AG headings at 403. Otherwise, AG and AGM heading pairs processing is done (410). If the data pairs are within a threshold $k_1$ (404), the system is further assessed if it was previously stationary (405). Otherwise, the system state is identified as not stationary at 406. If the system was previously stationary (405), a threshold $k_2$ determined at 407 is checked to determine whether the mean is within the threshold $k_2$ of a stationary heading. Otherwise, the stationary heading is set to the mean (408). If the mean is within the threshold $k_2$ of the stationary heading (407), the system is set stationary at 409. The oldest AG and AGM heading pair with stationary state is obtained at 411 under both events that the system is stationary or not (406 and 409). Note that oldest headings refer to the heading pair at T in the heading pair queue.

When a stationary state is identified, the current drift does not change. Since there can be a lot of latency in the system as AG and AGM headings are accumulated over time to analyze different subsystems, one way to approach this without disrupting those subsystems is to offset the current drift by the adjustment of the newly calculated current drift of the system. In doing this, the current drift does not actually change, and the system recovers immediately after the IMU is moved again. Note that most IMU fusion software can detect if the IMU is stationary, in which case this part of the process could be replaced with fusion software output or another algorithm to identify that the IMU is not moving.

Figure 4B:
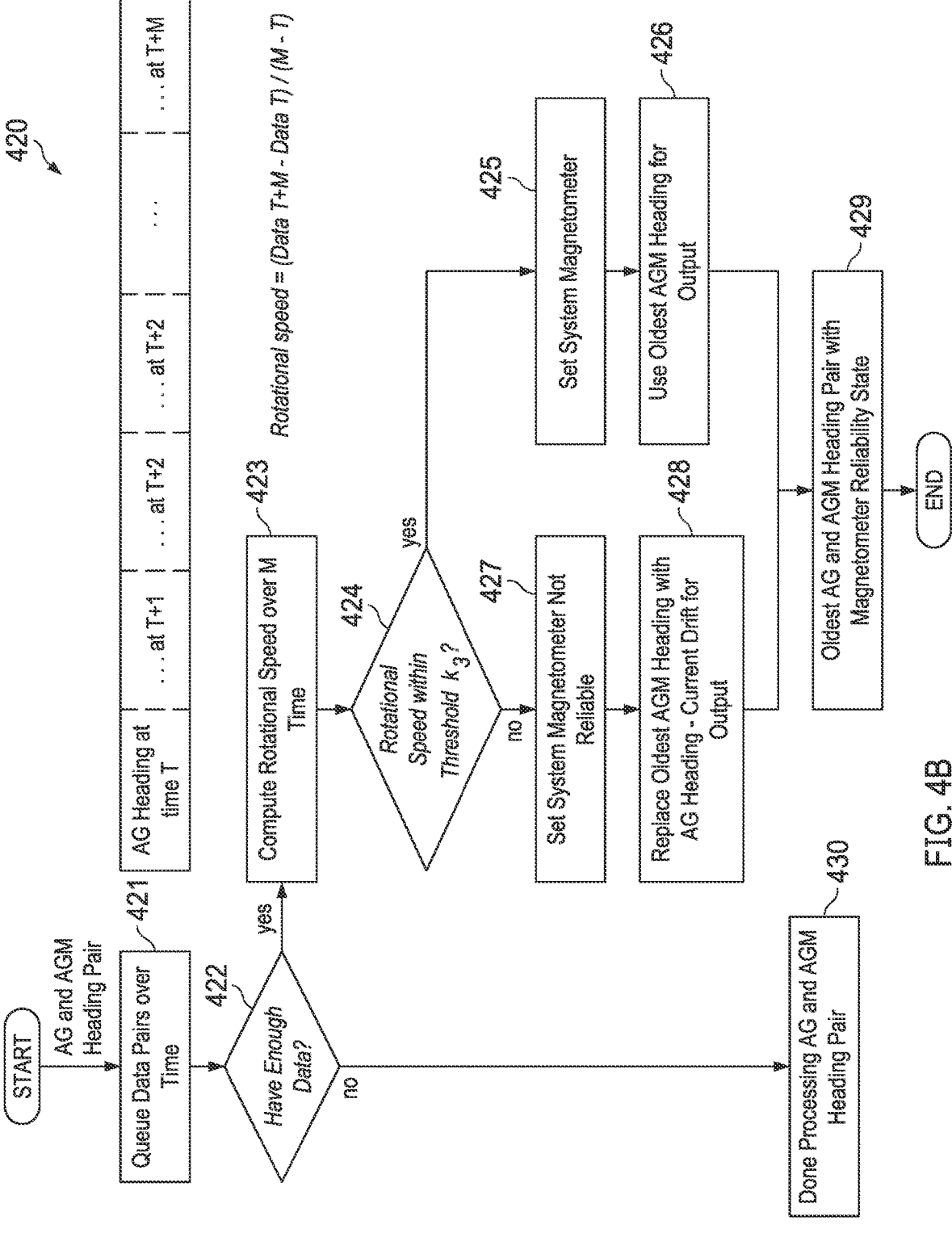
FIG. 4B is a flowchart of an algorithmic process which can be implemented in a system that identifies an unreliable state, according to an example embodiment of the present disclosure.

A second state can be defined for the system and that is if the IMU is rotating too fast. The faster the IMU rotates/moves around in space, the less reliable the AGM headings are during that time. FIG. 4B is a flowchart of an algorithmic process 420 of the present disclosure which can be implemented in hardware or a suitable combination of hardware and software, such as a system that identifies an unreliable state, according to an example of the present disclosure. AG and AGM heading pairs can be queued over time at 421, for intervals from 1 to M. If there is enough data (422), rotational speed is computed over M time at 423. Otherwise, AG and AGM heading pairs processing is done (430). Rotational speed is determined by the difference of data at T+M and data at T over the difference of M and T. If the rotational speed is determined within a threshold $k_3$ (424), the system magnetometer is set as reliable at 425. Otherwise, the system magnetometer is set as not reliable at 427. When the system magnetometer is set as reliable, the oldest AGM heading is used for output at 426. On the other hand, the oldest AGM heading is replaced with the AG heading minus current drift for output at 428 when the magnetometer is set as not reliable. Finally, the oldest AG and AGM heading pair is obtained with magnetometer reliability state at 429. Note that oldest headings refer to the heading pair at T in the heading pair queue.

Algorithmic process 420 uses the AG headings over time to determine how much the IMU is rotating. For the system, a rotational speed limit is identified, and when the AG headings indicate that the limit is exceeded, the system enters an unreliable AGM heading state until the rotational speed falls back within the acceptable limit.

When the magnetometer readings are determined to be unreliable, they are not used. The system is dependent on a long set of AG and AGM heading pairs, so a more reliable representation of the AGM heading replaces the AGM heading when this is encountered. Since current drift is defined as an AG heading offset that more accurately represents magnetic North for the IMU's environment, AGM heading is replaced with the AG heading–current drift. FIG. 4B describes an approach to determining that the IMU is rotating too fast for reliable AGM headings. This process can be implemented by utilizing accelerations identified by the accelerometer to account for translational movement. This process can be tuned to the sensitivity of the IMU to identify when the AG heading–AGM heading values spike only when the IMU is moving/rotating, which is how the process can be defined for a specific IMU.

Note that M and N are defined in the example embodiments of FIG. 4A and FIG. 4B, which are configured for the processes based on how much data/time is needed to accumulate enough information to accurately assess if the IMU is stationary and the magnetometer is reliable, respectively. If both systems report a state, then the AG and AGM heading pair that are returned with evaluated state information can be passed to the next process, Extract Magnetic Field Error; otherwise, if there are not enough AG and AGM heading pairs to calculate the current drift, the current drift remains at 0. Also note that FIG. 4A and FIG. 4B reference different thresholds. Each of those thresholds ($k_1$, $k_2$, $k_3$) can be determined by running the processes and determining what smallest value can be used for a threshold while reliably reporting when the IMU is stationary and when AGM headings are reliable. If thresholds are chosen that are too small or large, the states reported will be inaccurate, affecting the rest of the process. The values selected are dependent on the IMU accuracy and other configuration settings for the system.

Figure 4C:
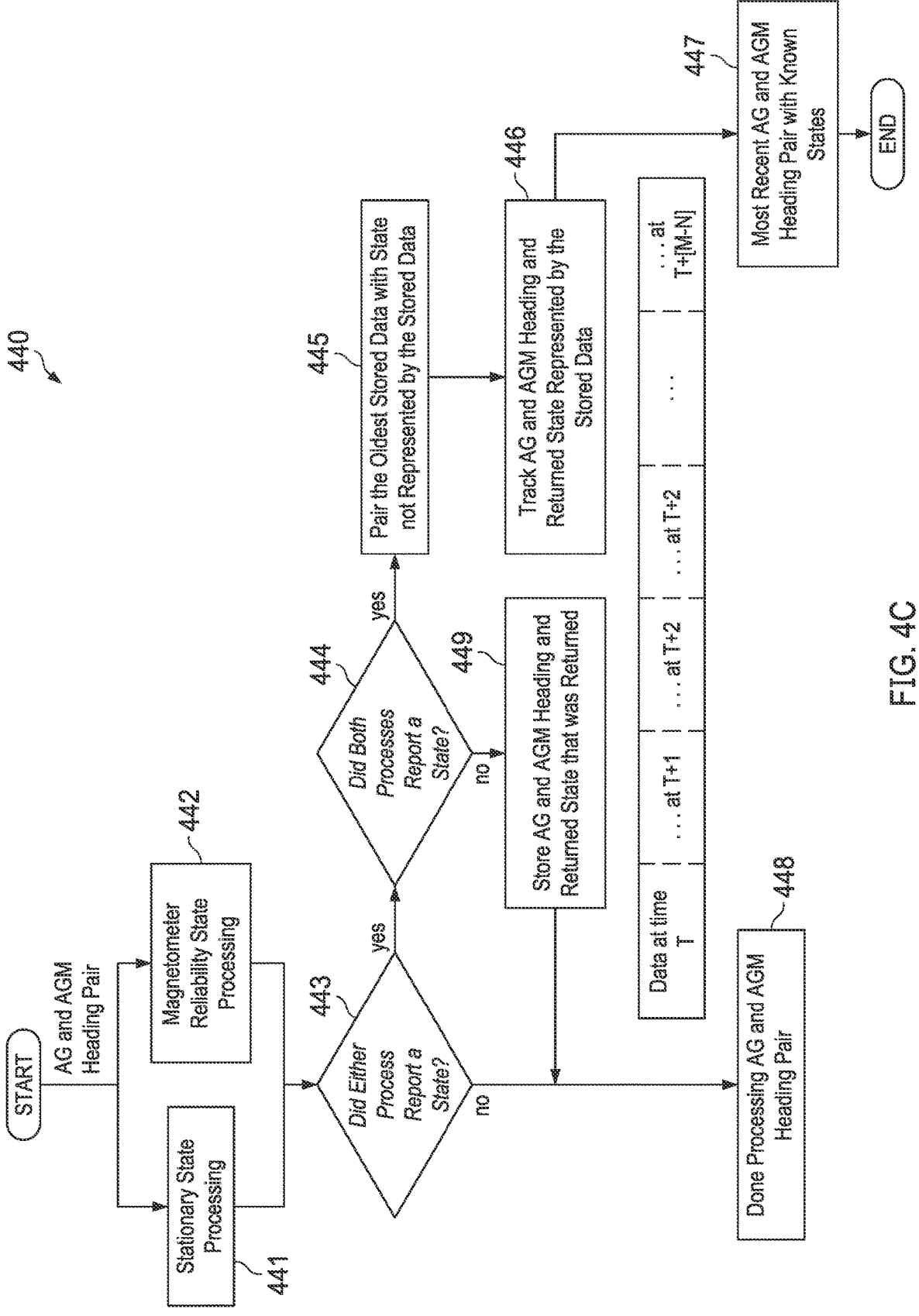
FIG. 4C is a flowchart of an algorithmic process which can be implemented in a system that identifies tracking states, according to an example embodiment of the present disclosure.

FIG. 4C is a flowchart of an algorithmic process 440 which can be implemented in hardware or a suitable combination of hardware and software, such as a system that identifies tracking states, according to an example of the present disclosure. FIG. 4C shows how the two processes of identifying a\stationary state and an unreliable state can be run in parallel, representing Identify Tracking States performed at 204 in FIG. 2. Here, the AG and AGM heading pairs are queued over time at 441 and 442, for intervals from 1 to |M-N|. If either process reports a state (443), the process 440 proceeds to 444 to determine if both processes reported a state. Otherwise, the AG and AGM heading pairs processing is done (448). If both processes report a state (444), the oldest stored data is paired with state not represented by the stored data (445). Otherwise, only one process reports a state, and the AG and AGM heading and the returned state is stored at 449, and the process 440 is going to 448 indicating the AG and AGM heading pairs processing is done. Following 445, AG and AGM heading and returned state represented by the stored data is tracked at 446 and the most recent AG and AGM heading pair with known states is obtained at 447.

Extract Magnetic Field Error

At this point in the process, the AGM headings can be considered reliable representations of the environment that the IMU is in. An estimate of magnetic North (which can be determined by the AGM heading at this point in the process) is very accurate when the AGM heading is facing magnetic North (when AGM heading–the initialization offset=0°). The error changes as the IMU is rotated away from the magnetic North and is not consistent because there are many magnetic fields in the environment. This is similar to the effect that is seen if a compass is slowly rotated; North is not consistent at different compass orientations. A similar effect occurs when the compass is tilted.

Figure 5A:
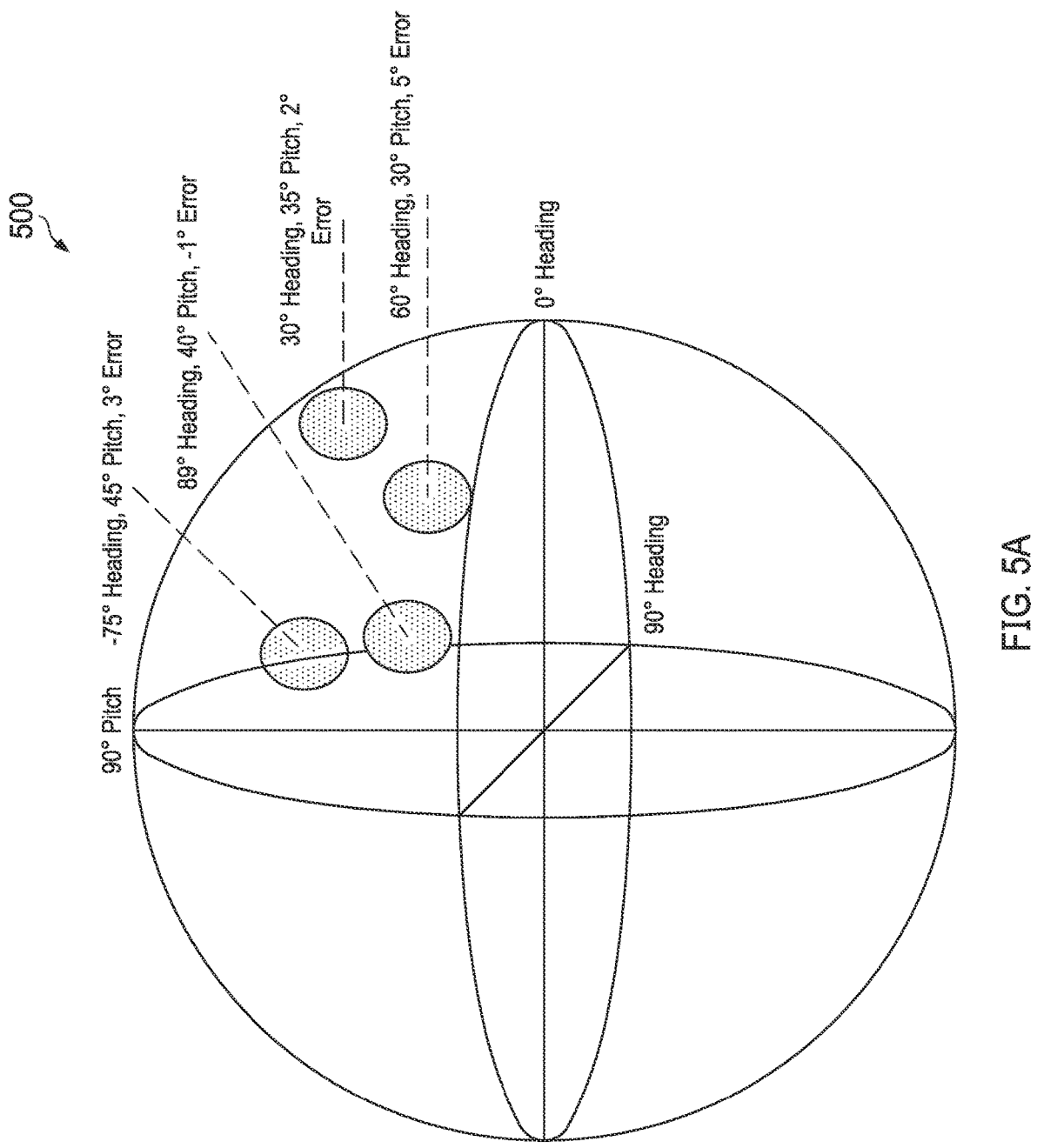
FIG. 5A is an example schematic diagram that illustrates how the magnetic error can be defined for the environment that the IMU is in, according to an example embodiment of the present disclosure.
Figure 5B:
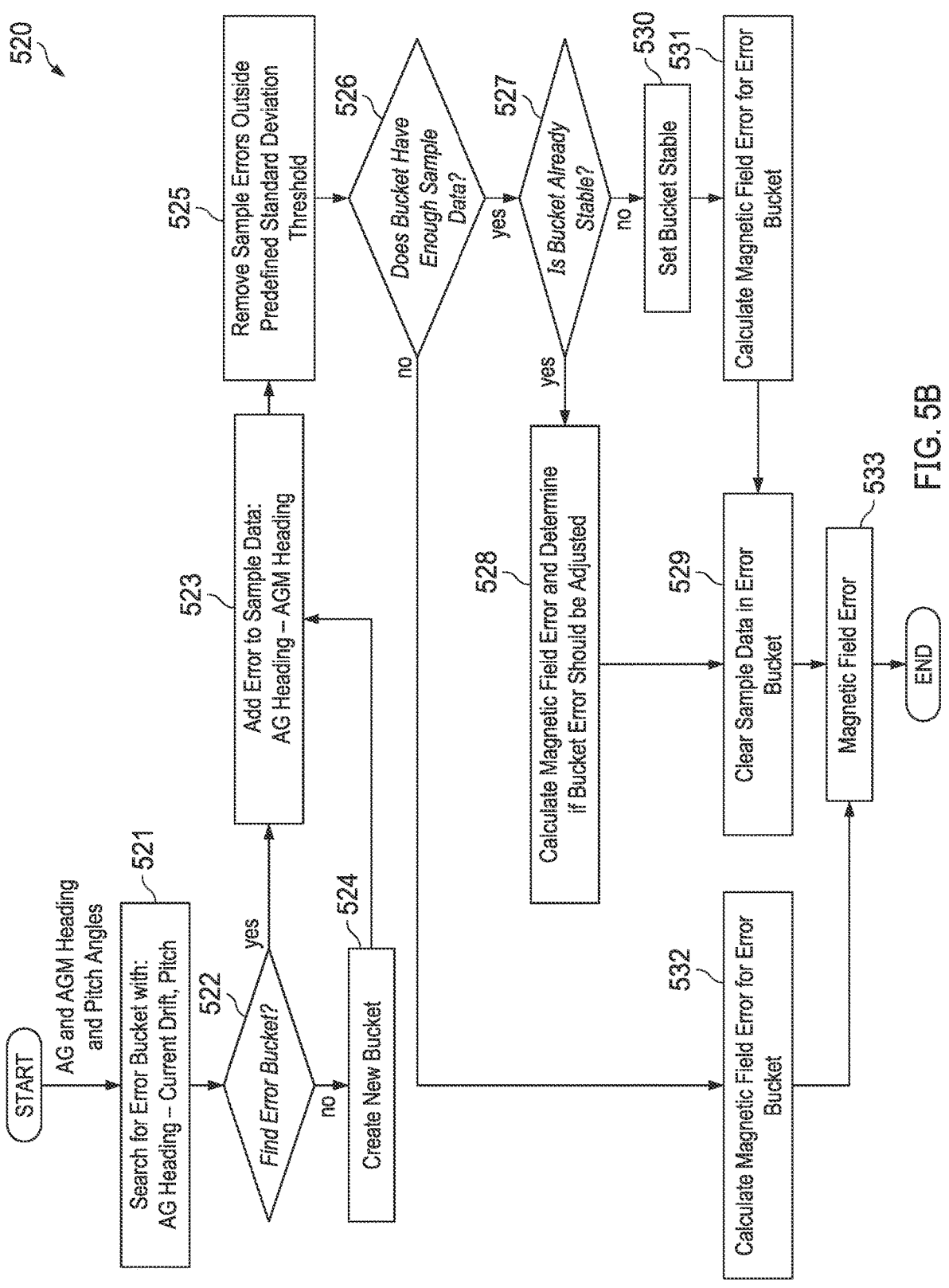
FIG. 5B is a flowchart of an algorithmic process which can be implemented in a system that calculates magnetic field error for the environment that the IMU is in, according to an example embodiment of the present disclosure.

FIG. 5A is an example schematic diagram 500 that illustrates how the magnetic error is defined for the environment that the IMU is in, according to an example of the present disclosure. FIG. 5B is a flowchart 520 of an algorithmic process of the present disclosure which can be implemented in hardware or a suitable combination of hardware and software, such as a system that calculates magnetic field error for the environment that the IMU is in, in accordance with an example embodiment of the present disclosure.

FIG. 5A and FIG. 5B illustrate an algorithmic process that uses the AG and AGM headings to develop a representation of the environment's magnetic field in terms of error from magnetic North. Based on the IMU's orientation (AG heading–current drift), the environment's magnetic field error can be referenced and removed from the AGM heading to represent a more accurate AGM heading. For example, if the IMU is rotated 90° around vertical as detected by the AG heading and the AGM heading consistently reads 92°, the magnetic field error at 90° is 2°.

To define the magnetic field errors, buckets of data sets are formed from the AG heading data sets and the AGM heading data sets when the AGM heading data sets are considered reliable. A bucket is defined by the orientation of the IMU, which is created from AG heading current drift and a pitch angle (not affected by drift). Using these two values, a bucket is identified if the data set values are both within a threshold range of the sample data. If there is no bucket within range, then a new bucket is formed with the new set of sample data. Suitable methods to determine if a bucket is close to the sample data include determining whether an angle between the bucket's position in space and the IMU forward direction is less than a predetermined angle.

As reliable AGM heading data is gathered, each set of sample data can be added to an existing bucket of sample data. A sufficient number of sets of sample when enough sets of ample data have been added to comfortably determine a consistent error for the bucket, which can be referred to as a stable state. When a bucket's state is stable, its calculated error for the heading and pitch area will not change or will change very little (adjusting for error), because the bucket is represents a stable magnetic field when the IMU is in a particular environment. Determining when a bucket is stable is a function of the number of sample data sets, how accurate the final error should be, and how fast the magnetic field error is to be defined, to reduce the latency of the system updating the current drift. Statistical evaluation methods used to perform these functions will vary, based on the availability and data values associated with these factors.

For example, in FIG. 5A, it can be determined that if the fastest an AG heading and AGM heading pair are retrieved is once every 0.0085 seconds, and if the IMU is stationary for one second and is retrieving consistently reliable data, then the error bucket should become stable. In one second, about 118 samples will be generated, based on this data rate (is 0.0085 s). Gathering several sets of data at different IMU orientations, there is a standard deviation for the different buckets of 0.9°. Using these constraints, any sample data gathered from outside of 0.9° can be discarded from use in 1) determining the mean of a set of sample data, before using the average AG heading–current drift to determine the bucket's new heading, 2) the average pitch to determine the bucket's new pitch, and 3) the error bound (AG heading–current drift–AGM heading) that is used to determine whether the error for the bucket's orientation is acceptable.

Over time, several stable buckets and unstable buckets (ones with not enough samples to become stable) will help define the magnetic field error for the environment that the IMU is in. In FIG. 5B, the Extract Magnetic Field Error process 520 is outlined. Process 520 starts at 521 where a search is performed for an error bucket with a difference value of AG Heading, a Current Drift and a pitch. If an error bucket having these parameters is found (522), the error is added to the sample data so that the sample errors will equal a difference value of the AG Heading data and the AGM Heading data (523). Otherwise, a new bucket is determined at 524 and added back to 523 to determine the sample errors, which will be equal to the difference value of the AG Heading data and AGM Heading data. Sample errors that are outside of a predefined standard deviation threshold are removed at 525. If the bucket has enough sample data (526), it is then determined whether the bucket is already stable (527). Otherwise, magnetic field error data for the error bucket is calculated at 532. If the bucket was previously stable (527), magnetic field data is calculated, and it is determined whether bucket errors should be adjusted at 528. Otherwise, the magnetic field error bucket is set to stable (530) and the magnetic field error for the error bucket is calculated at 531. Sample errors are cleared in the error bucket (529), following 528 and 531. The magnetic field error is obtained following step 532 and 529 (533).

The magnetic field error can be removed from the AGM heading later in this process; however, there can be gaps between stable magnetic field error buckets (e.g.: FIG. 5A), and there can also be buckets that are unstable with not enough samples to assuredly estimate an error for the bucket's orientation. Both of these sets of data are helpful in determining how to detect magnetic field disruptions and compensate after a disruption is found to improve the long-term accuracy of current drift calculations.

Using Magnetic Field Error

When determining the magnetic field error for an IMU orientation, the closest buckets to the IMU orientation can be collected and interpolated to determine an estimate for the magnetic field error. There are different suitable ways to interpolate the data. For example, using the closest three buckets, bary-centric coordinates can be used to estimate the error. Another example is to use a weighted average based on the distance from the IMU's orientation to the bucket and whether or not the bucket is stable, giving greater weight to stable buckets and buckets that are closest to the IMU orientation. Other suitable processes can also or alternatively be used.

Figure 6A:
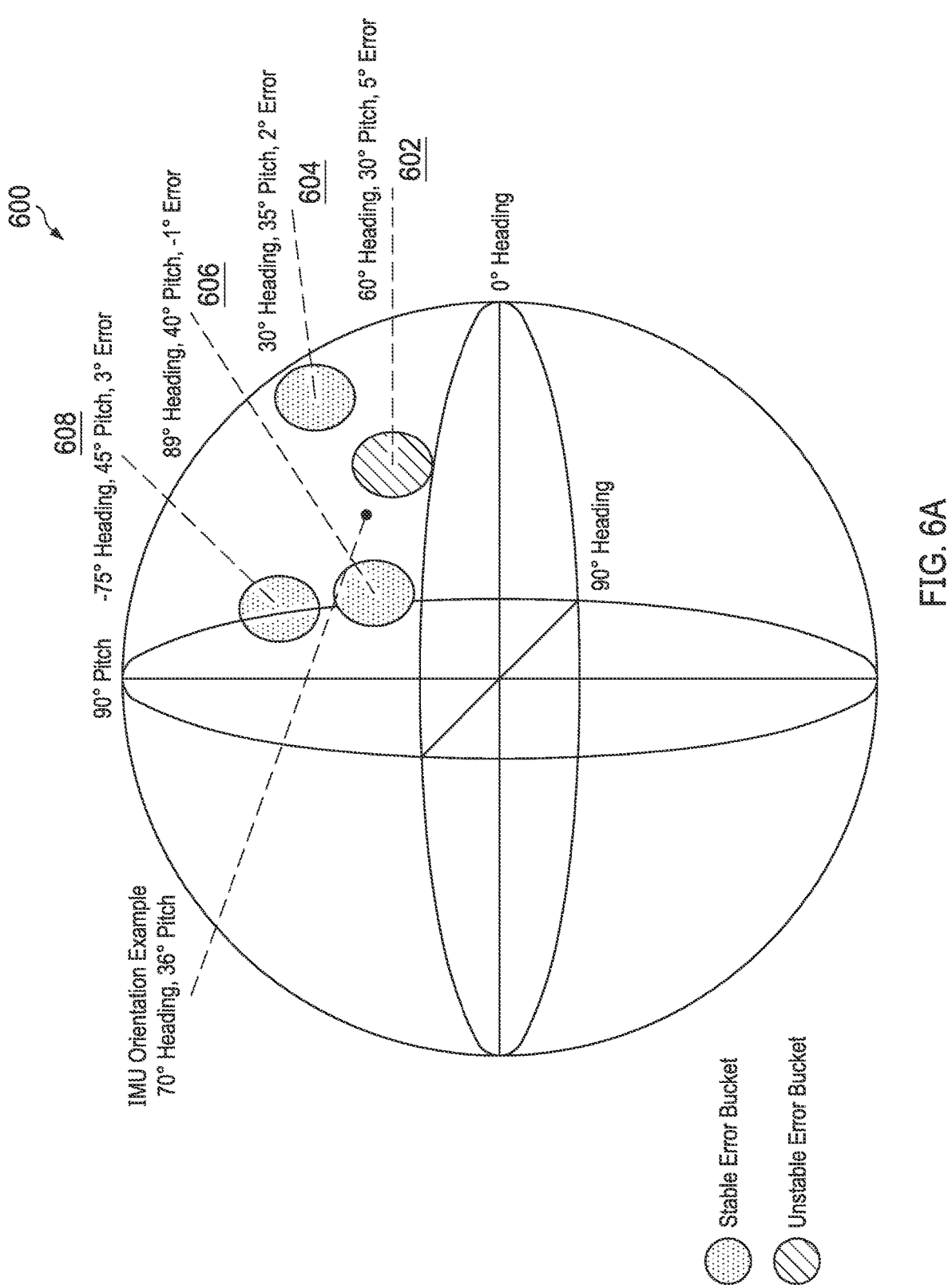
FIG. 6A is an example schematic diagram that illustrates how an estimate for the magnetic field error can be determined, according to an example embodiment of the present disclosure.
Figure 6B:
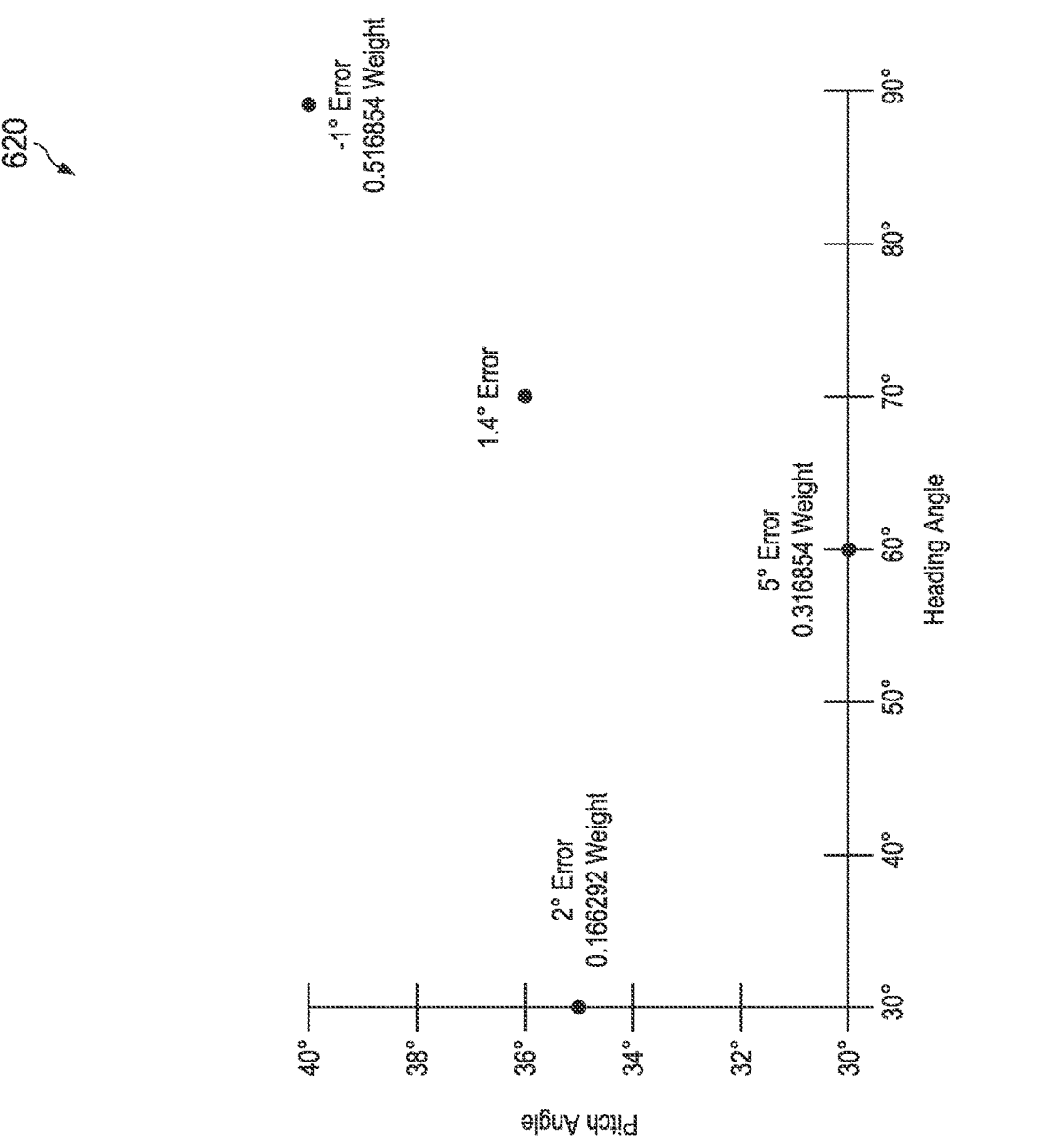
FIG. 6B is a graph that illustrates how an estimate for the magnetic field error can be determined, according to an example embodiment of the present disclosure.
Figure 6C:
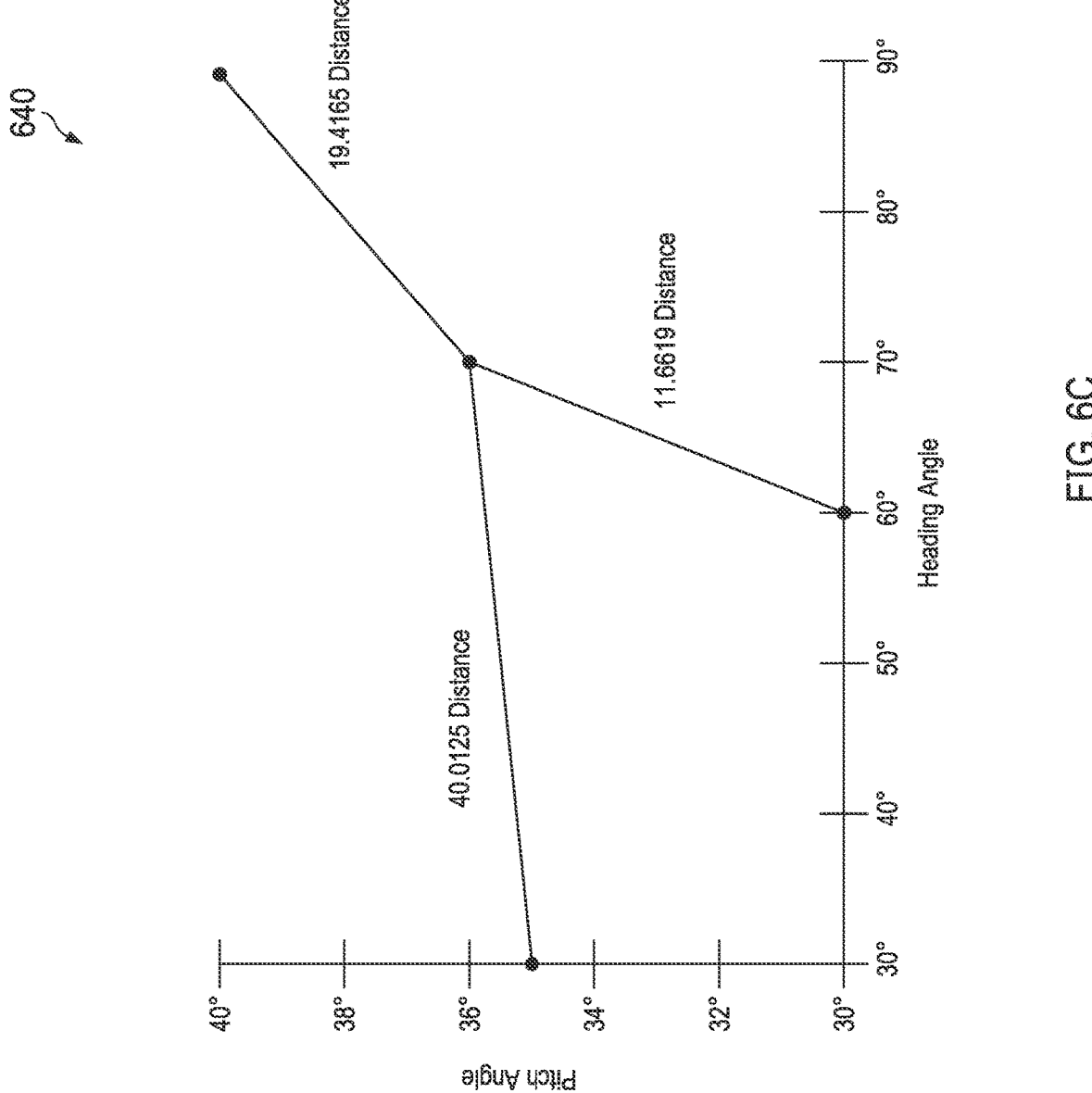
FIG. 6C is a graph that illustrates how an estimate for the magnetic field error can be estimated, according to an example embodiment of the present disclosure.

FIG. 6A-6C illustrate how the magnetic field error can be estimated, according to example embodiments of the present disclosure. In FIG. 6A, the IMU is oriented with a 70° heading and a 36° pitch. Each of the shaded circles represents a bucket with the valid sample data range being the shaded region. The darker error bucket 602 is unstable while the lighter error buckets 604, 606 and 608 are stable.

As an example of an interpolation method, using bary-centric coordinates requires finding three error buckets that are non-linear and as close to the IMU heading as possible. In the example of FIG. 6A, the 89° heading and 40° pitch, 60° heading and 30° pitch, and 30° heading and 35° pitch are the surrounding points. (In this example, the unstable point is not weighted differently than the stable points but there are suitable alternative solutions that weight stable and unstable points differently.) The weights of each of the error buckets (surrounding triangle points) are applied to the bucket errors to estimate the error for the IMU heading, giving 1.4° magnetic field error for the IMU heading.

To determine stability, the buckets that are closest to the IMU's orientation can be used. If the IMU orientation is within a predetermined threshold angle of the error bucket, that bucket's stability can be used; otherwise, an interpolation method can be used if the IMU orientation is in between two buckets but not too far away. All of the thresholds for determining stability in this way can be based on testing for best results. The goal is for the error buckets to identify the IMU orientation as stable if the AGM Heading–magnetic field error (through the process described above) has a confidently low error. The farther the IMU orientation is from stable error buckets, the less confidence there is in the result of AGM Heading–magnetic field error.

In this example, the closest error bucket is used to determine stability if the error bucket is within a particular threshold (20°). If the closest error bucket is outside of the threshold, the magnetic field error reported is unstable. In the example from FIG. 6A-6C, the error bucket at 60° heading and 30° pitch is closest to the IMU heading at 70° heading and 36° pitch, so the stability of that bucket is used to represent the stability of the IMU heading. This error bucket is unstable, so the IMU heading has an unstable magnetic field error.

Calculating Drifts

Figure 7A:
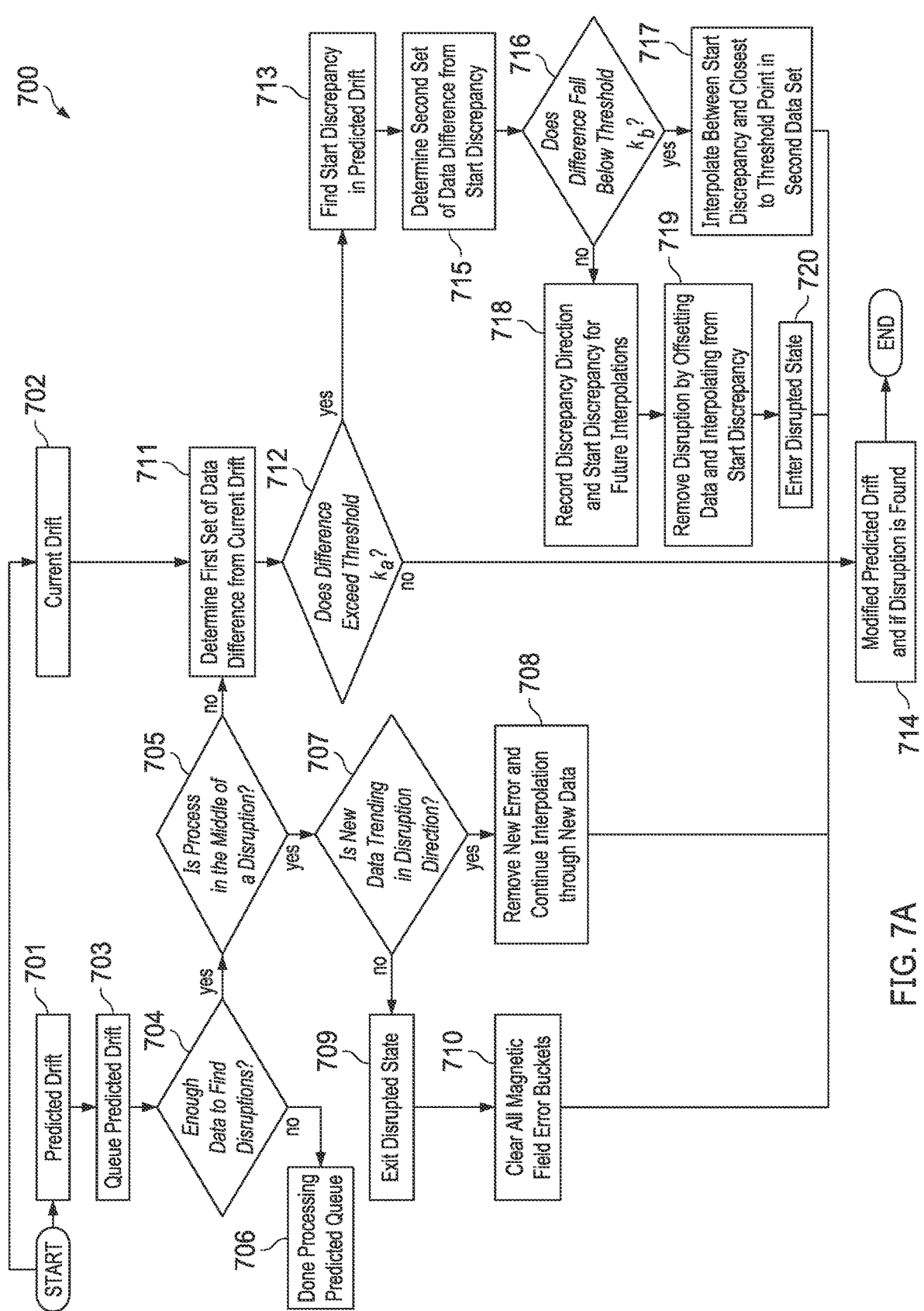
FIG. 7A is a flowchart of an algorithmic process which can be implemented in a system that removes magnetic field disruptions, according to an example embodiment of the present disclosure.

FIG. 7A is a flowchart of an algorithmic process 700, which can be implemented in hardware or a suitable combination of hardware and software, such as a system that identifies magnetic field disruptions (which can be needed to remove magnetic field disruptions), according to an example of the present disclosure. Process 700 includes calculating predicted drift at 701 (as discussed below) and current drift at 702. Predicted drift is then queued at 703. If it is determined that the queued predicted drift data is sufficient to find disruptions (604), the process 700 determines whether a disruption is currently occurring (605). Otherwise, the data in the predicted queue is done processing at 706. If it is determined that the process is in the middle of a disruption (705), it is further determined whether new data is trending in a disruption direction (707). If not, then a first set of data difference from current drift is determined (711). If there is new data trending in the disruption direction (707), new error is removed and the process 700 continues interpolation through the new data (708). Otherwise, the process 700 exits the disrupted state at 709 and all magnetic field error buckets are cleared at 710.

Following 711, if it is determined that the first set of data difference exceeds a threshold $k_a$, the process 700 proceeds to find a start discrepancy in the predicted drift at 713. Otherwise, a modified predicted drift is determined at 714. A second set of data difference from the start discrepancy is determined at 715. If the second set of data difference falls below a threshold $k_b$ (716), the start discrepancy and a point closest to a threshold point in the second data set is interpolated at 717. Otherwise, the discrepancy direction and the start discrepancy for future interpolations are recorded (718). At 719, the disruption is removed by offsetting data and interpolating from start discrepancy, and the process 700 enters a disrupted state at 720. A modified predicted drift is determined following step 710, 708, 712, 720 and 717 including if a disruption is found (714).

Drift is calculated three different times/ways within this example process, two of which happen after a sample is either added to an error bucket or discarded because the IMU is determined to be in an unreliable magnetic reading state.

The first time, the drift is calculated using the AG heading and the AGM heading without magnetic field error (the magnetic field error buckets that were formed above). This drift is referred to as the naïve drift. The AGM heading minus the magnetic field error can be used with the AG heading if the pitch and heading are in a stable error state; otherwise, the calculated drift can be used instead of the AGM heading when calculating this drift. This process creates a drift output that does not lose visual stability between stable and unstable error buckets, which is referred to as the predicted drift. The third drift calculation can be based on the predicted drift after it is modified by handling other sources of magnetic field error (like magnetic field disruptions) and is not completely computed until the end of the process. This drift is called current drift and has been referenced earlier when extracting magnetic field error.

Magnetic Field Disruptions

In the process of FIG. 7A, the magnetic field is assumed to be stable until a disruption is detected. The predicted drift 701 can be used by queuing a long set of data at 703 that can be analyzed for potential disruptions. The amount of data needed can be based on the system's needs; for example, detection and correction of disruptions can happen with a larger set of data, but this increases the latency of the system in determining a current drift, which is used in the rest of the system. Reducing this size as much as possible while still being able to detect magnetic field disruptions will achieve the best results for this situation.

The system outputs the oldest predicted drift data at 714, where drift data has been queued after enough data has been gathered to find magnetic field disruptions. The output predicted data is the modified data, so any offsets from earlier and current disruptions are accumulated and represented in this output. Also, when the system exits the disrupted state, the magnetic field error buckets are all cleared, such as when the offset that was accumulated still has error in it, because the disruption detection process guesses at where a disruption starts and ends. When the data has stabilized, the remaining error is largely compensated for when the error buckets are reset and built with new data.

Figure 7B:
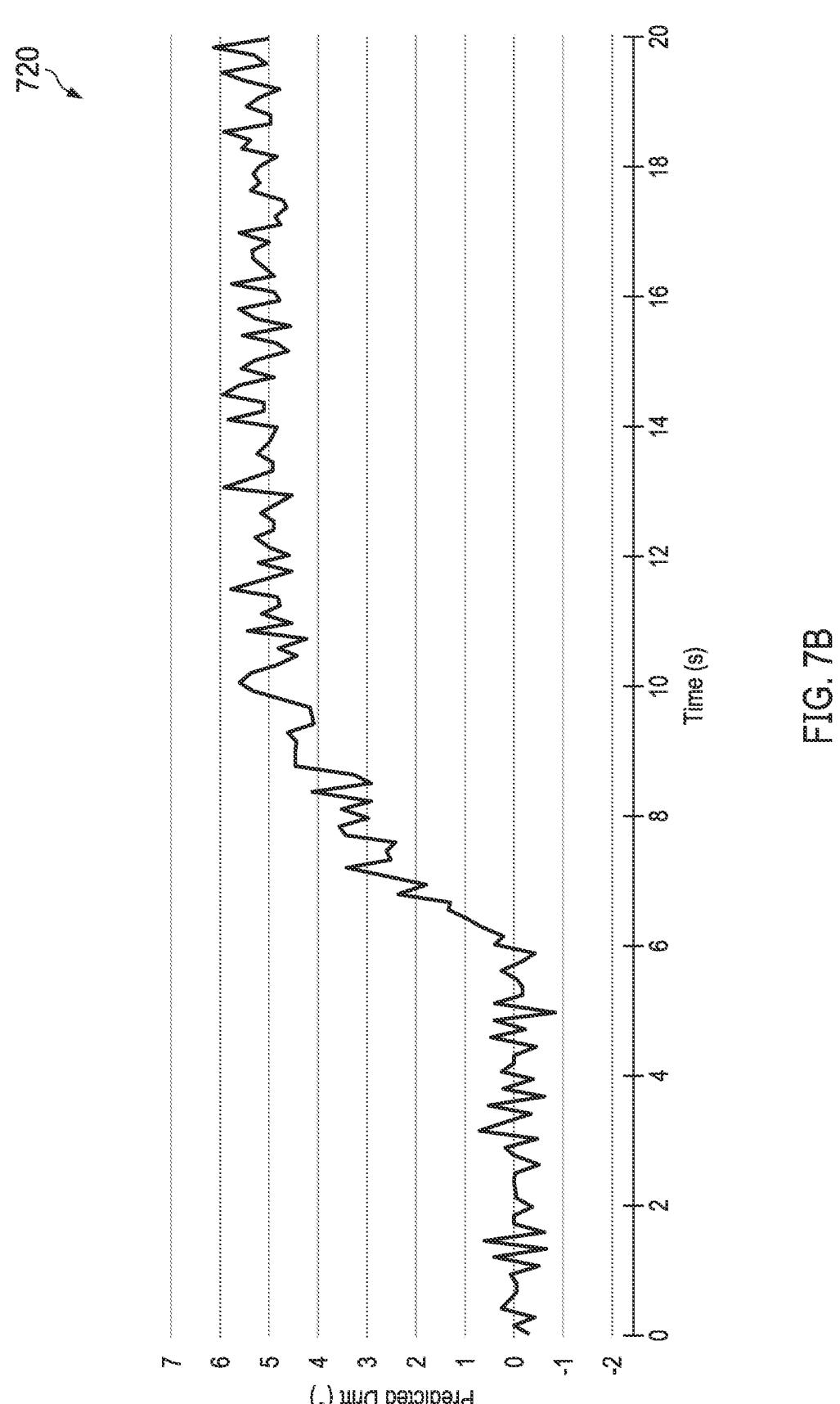
FIG. 7B is a graph that shows an example of a magnetic field disruption, according to an example embodiment of the present disclosure.

FIG. 7B is a graph that shows an example of a possible magnetic field disruption, according to an example of the present disclosure. FIG. 7B is a specific example that shows a possible magnetic field disruption as seen when the predicted drift values are graphed over a 20-second window. A little after 5 seconds into the graph, the data shifts, where the trending predicted drift moves from about 0° to about 5°, 11 seconds into the graph.

Figure 7C:
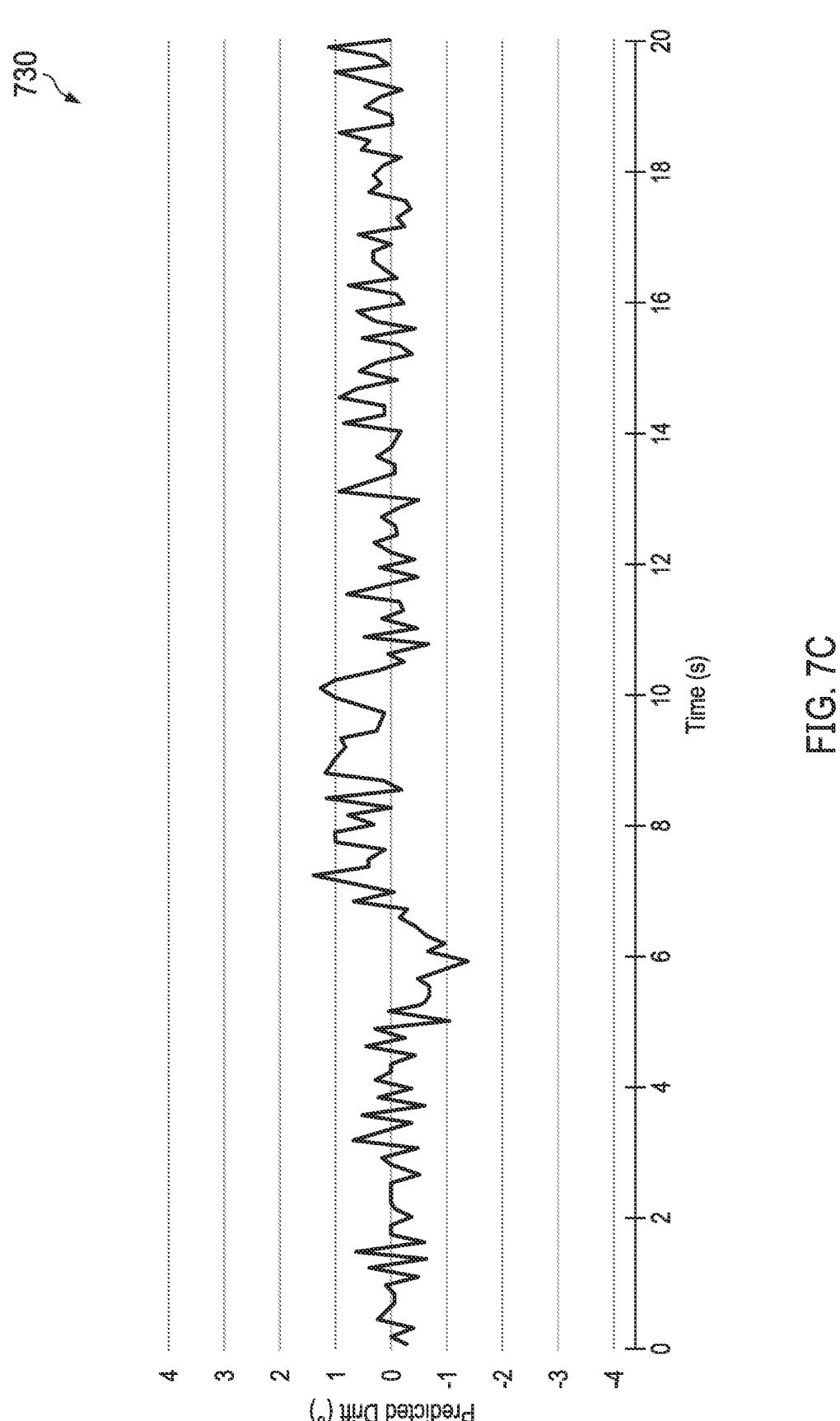
FIG. 7C is a graph that shows an example result of processing the data as shown in FIG. 7B, according to an example embodiment of the present disclosure.

After the disruption is identified, the process attempts to correct it, so the disruption minimally affects the calculation of the current drift calculation. The disruption angle found (5°) is removed from the data after 11 seconds and the data is unmodified before 5 seconds. Between the start and end of the found disruption, the offset is interpolated from 0° to 5° to remove the disruption. There are different suitable ways to interpolate the data. As an example, FIG. 7C shows the results after linearly interpolating the offset between 0° to 5°.

There may still be error in the data in the reported IMU headings, the drift calculations, the magnetic field error output and other related data. An iterative process can be used when the magnetic field error is considered unstable, such as by using the current drift in place of the predicted drift when it gives better results by eliminating detected disruptions that were the result of magnetic field error that did not have enough samples to represent the magnetic field well.

Figure 7D:
FIG. 7D is a graph that shows an example of a magnetic field disruption over a ten-second window, according to an example embodiment of the present, disclosure.
Figure 7D:
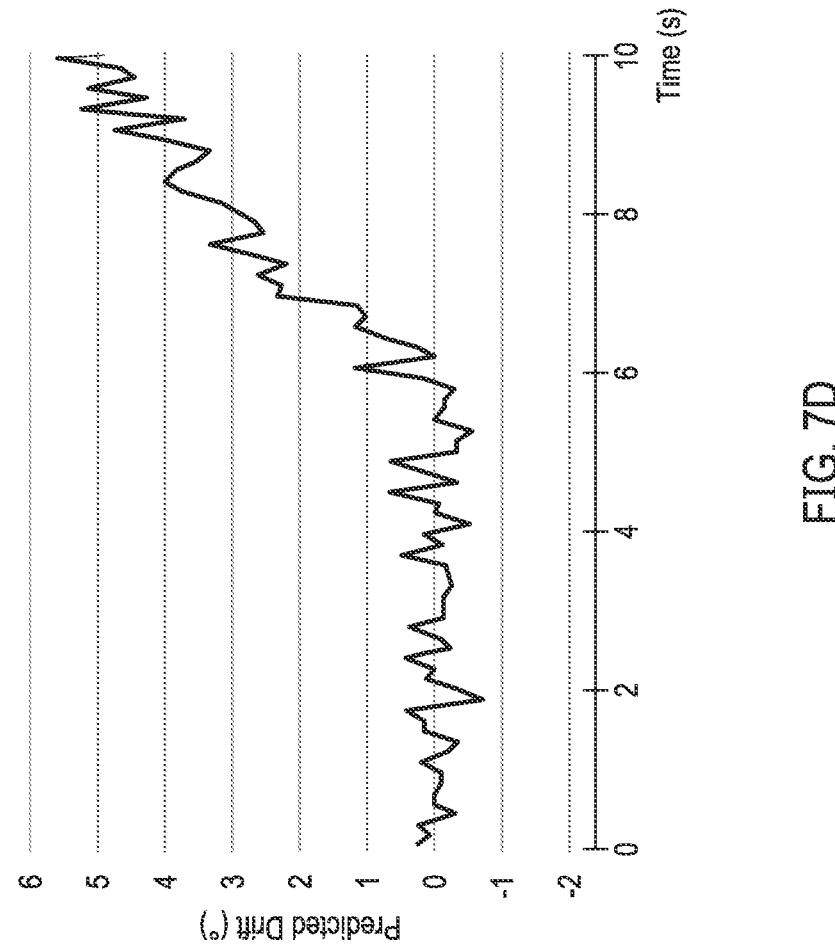

The current, drift can be solved faster if less predicted drift is accumulated when detecting disruptions; however, sufficient data should be used to avoid falsely identifying a disruption that is not actually there. FIG. 7D is a graph that shows an example of a possible magnetic field disruption, according to an example of the present disclosure. FIG. 7D shows a disruption over a 10-second window.

Figure 7E:
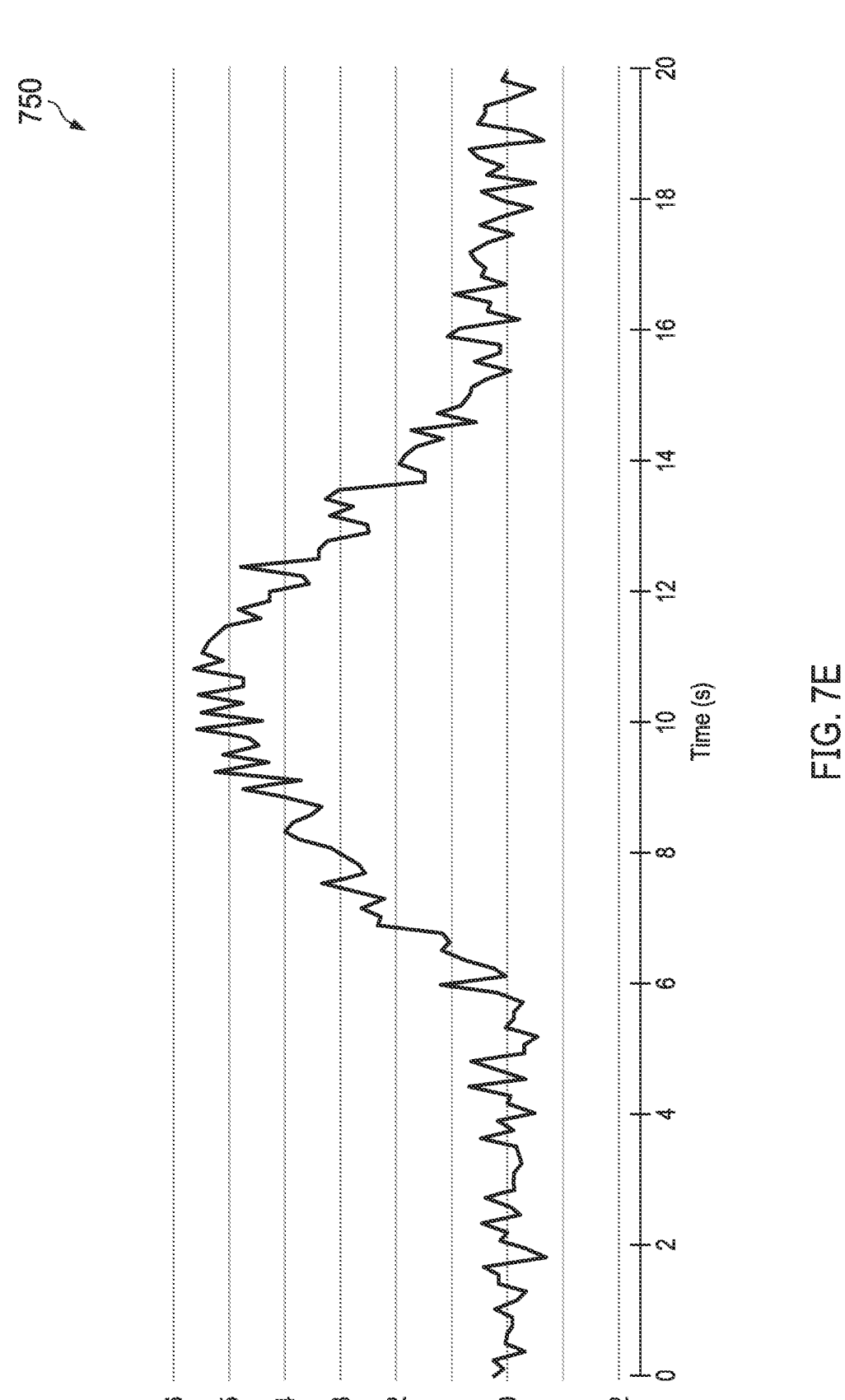
FIG. 7E is a graph that shows an example of a magnetic field disruption over a twenty-second window, according to an example embodiment of the present disclosure.
Figure 7F:
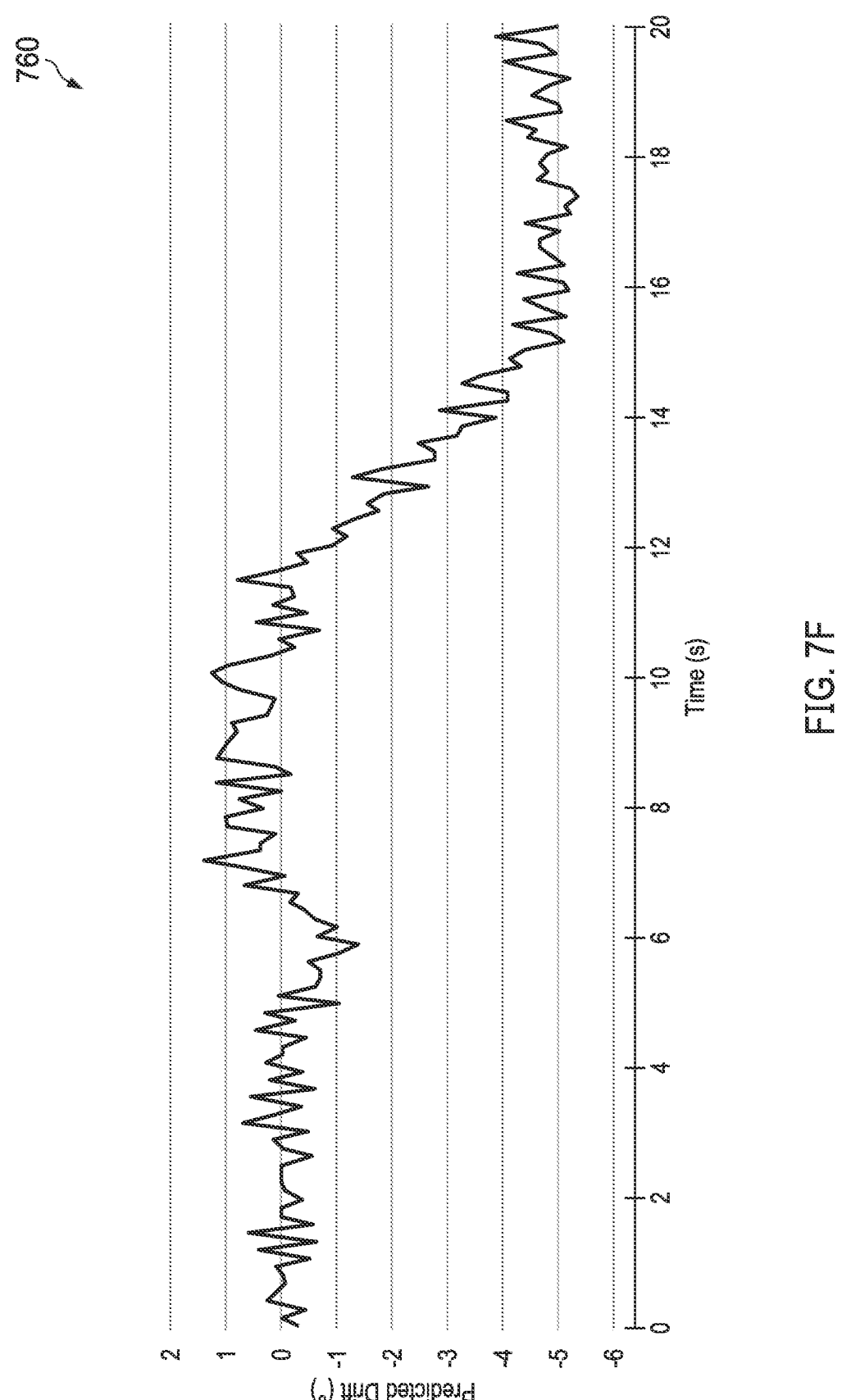
FIG. 7F is a graph that shows an example result of processing the data as shown in FIG. 7D, according to an example embodiment of the present disclosure.

To demonstrate the importance of having a large enough window, FIG. 7E represents the same data over a 20-second window. If the disruption detected in FIG. 7D is removed, the resulting data is shown in FIG. 7F.

In the event that a 10-second window s used, the disruption would be detected and then all predicted drift data output from the system would be adjusted by −5°, which would negatively impact the current drift calculations. This can be avoided by increasing the window to 20 seconds (FIG. 7E). Then the same process is taken from the start to the end of the disruption (5 seconds to 16 seconds in), but instead the data is interpolated between those two end points, smoothing away the curve that would negatively influence the current drift.

A magnetic field disruption may also be detected but not yet stabilized. In this case, FIG. 7D is an example of what the data may look like; however, the data would keep trending higher after the period shown, and should eventually reach a plateau. If no plateau is detected, the disruption logic can enter an unstable mode, where the data is continually offset (similar results to FIG. 7C) until the predicted drift data stops trending in the direction of the disruption.

When searching for a disruption, sufficient data is needed afterwards in case the disruption was temporary and the error can be removed from the predicted error data. One way to do this is to split up the queued predicted data into two sets of data. The first set is where a peak/valley is searched for to determine if there is a potential disruption. The following set of data is compared against the start of the disruption to see if the error drops below the threshold. If the error drops below the threshold in the second section, the peak/valley that was found can be removed by interpolating the error away as described above.

Figure 7G:
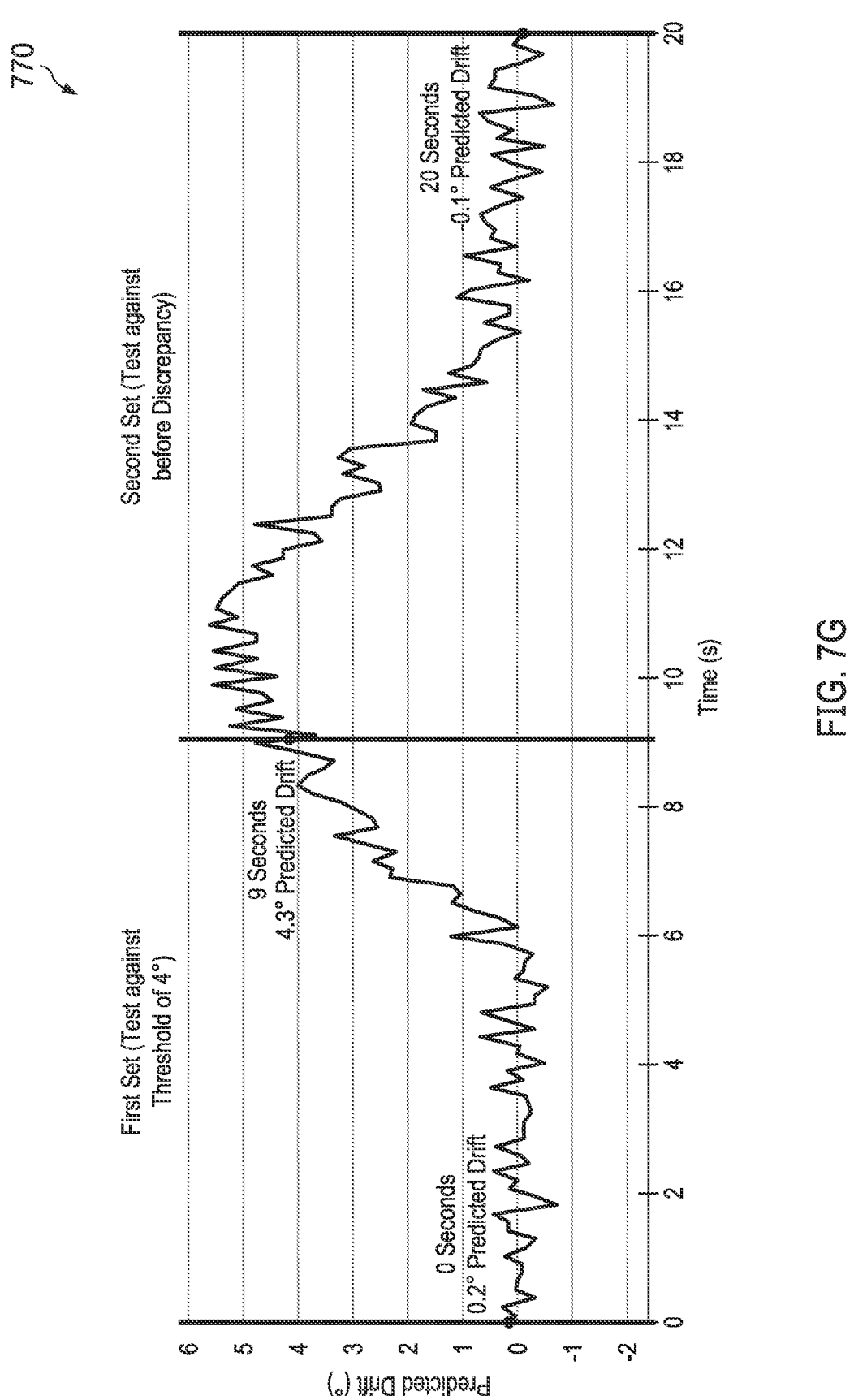
FIG. 7G is a graph that shows an example process of processing the data as shown in FIG. 7E, according to an example embodiment of the present disclosure.

FIG. 7G is a graph that shows an example process of processing the data as shown in FIG. 7E, according to an example of the present disclosure. FIG. 7G uses a 4° threshold, where the first set of data is 9 seconds of predicted drift data, and the second set of data is 20 seconds of predicted drift data. The current drift is 0° and the 9-second mark has a 4.3° predicted drift. Since |4.3°−0°|>4°, the threshold for a discrepancy, the second set of predicted queue data is used to see if the discrepancy is false and can be removed, or if the data can be offset by the error found. Starting at the end of the second set of data and working toward the 9-second mark, data is compared against the predicted drift at the beginning of the discrepancy (at 0 seconds). The first data at 20 seconds is −0.1° and the start data is 0.2° which is well within the 4° threshold, so in this case, the disruption can be interpolated between the start and end points to remove the unwanted error in the system.

Figure 7H:
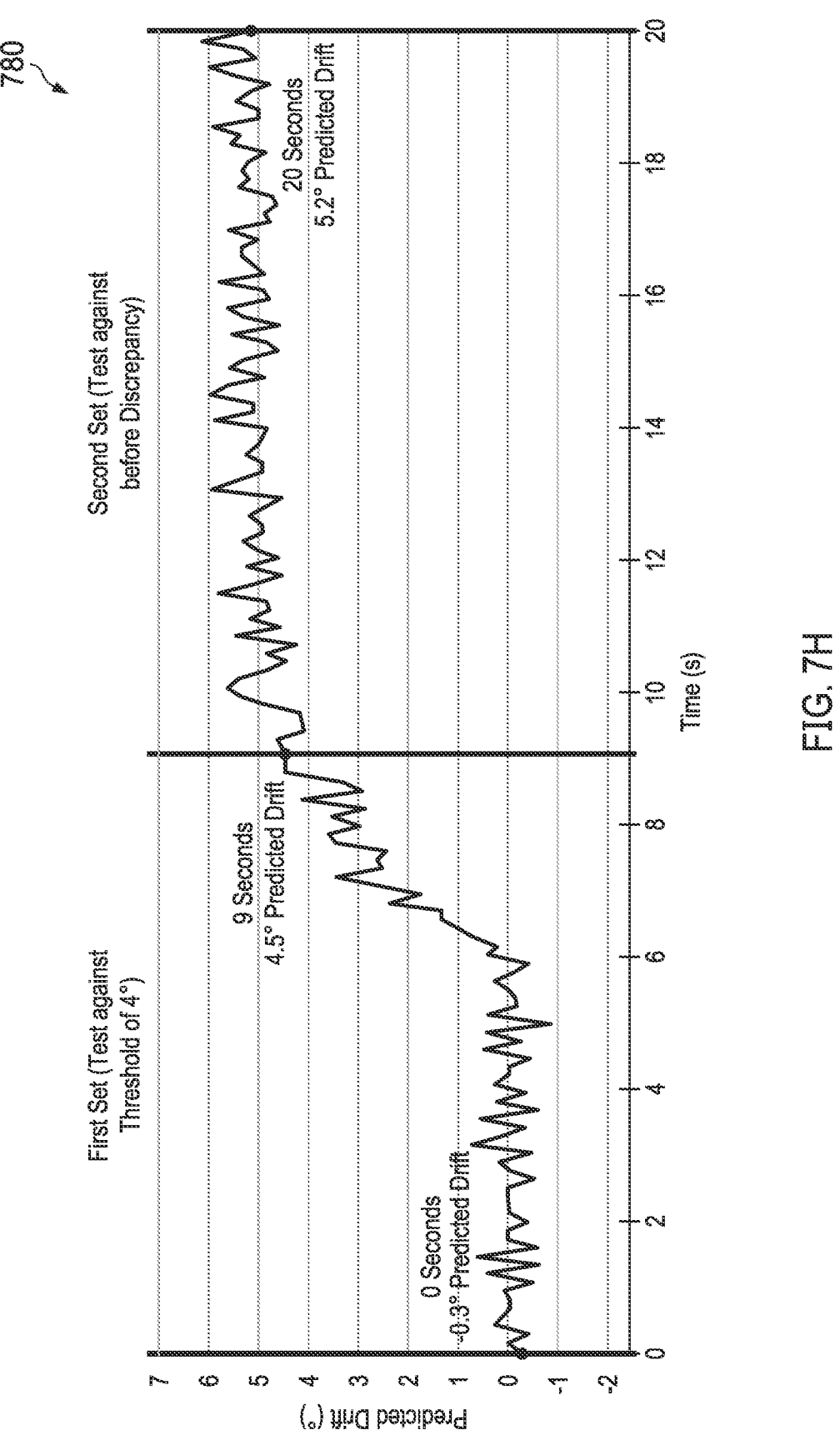
FIG. 7H is a graph that shows an example process of processing the data as shown in FIG. 7B, according to an example embodiment of the present disclosure.

FIG. 7H is a graph that shows processing of the data as shown in FIG. 7B, according to an example of the present disclosure. In this case, the first set of data test point is 4.5° and the current drift is 0°. This data is beyond the 4° threshold, so the second set of data is used to compare against the first data in the queue at −0.3°. Starting at the end of the second set, 5.2° predicted drift, and ending at the 20-second limit, the data is compared against −0.3° to test if it is within the threshold. There is no data in this region that is within the threshold, so a discrepancy is found, the data is offset and interpolated to remove the error from the system.

After a discrepancy is found, the predicted drift is compared against the initial discrepancy value for a predefined amount of time. If the data continues to increase or decrease (depending on the trend direction of the discrepancy), then the system stays in the disrupted state, offsetting and interpolating the data to remove the error. When the trend flattens or changes direction, the system returns to its original state, where it is searching for discrepancies. Note, the entire process described above works best when the predicted drifts values are smoothed before this analysis is performed because that removes the potential for false positive discrepancies that can result when one set of data is high and the other is low. There are also other suitable ways to process the data with a similar goal in mind; this is one solution that works, especially when the predicted drift, curves are smoothed.

Recovering from a Disruption

Figure 8:
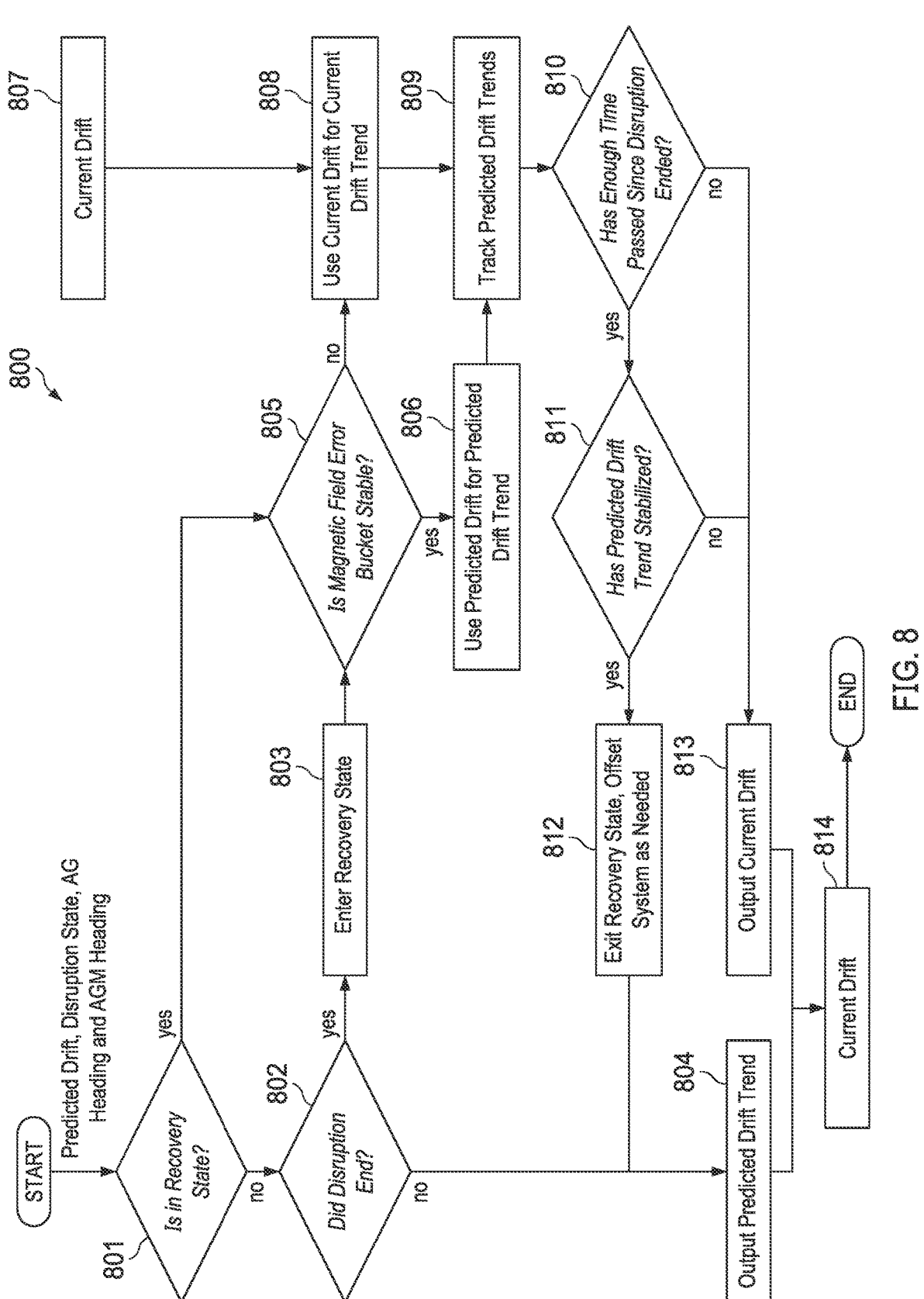
FIG. 8 is a flowchart of a process of which may be implemented in a system that recovers from a disruption, in accordance with an example embodiment of the present disclosure.

FIG. 8 is a flowchart of an algorithmic process 800 which can be implemented in a system that recovers from a disruption. The process 800 starts with the generation of predicted drift data, disruption state data, AG heading data and AGM heading data. If it is determined that the system is in a recovery state (801), the magnetic field error bucket is checked to determine if it is stable (805). Otherwise, if the system is not in a recovery state (801) and the disruption did not end (802), the predicted drift trend is used as output at 804. If the system is in a recovery state (801) and the disruption ended (802), the system enters a recovery state at 803. If the magnetic field error bucket is determined to be stable (805), the predicted drift is used for the predicted drift trend (806). Otherwise, current drift is calculated at 807 and is used for the current drift trend at 808. Following 808, predicted drift trends are being tracked at 809. If enough time has passed since disruption ended (810) and the predicted drift trend has stabilized (811), the process 800 exits recovery state and offsets system as needed (812). If either answer to decision 810 and 811 is no, the process 800 proceeds to 813, and the current drift is used as output. Then current drift is obtained at 814.

After exiting a disruption, the magnetic field error buckets have been cleared, which means the error reported is not representative of the magnetic field error for the IMU heading. The drift calculations will be off during this time, until the magnetic field error buckets have had some time to stabilize. In order to better refine the error, the predicted error output is monitored for some time until it has stabilized, using the stabilization results from the magnetic field error buckets. After the drift has stabilized, the predicted drift is offset again using the drift before the discontinuity, the newly stabilized value, and prediction of the drift accumulated during the disruption and recovery from the disruption.

For example, if the current drift was 4.3° prior to a disruption, the predicted drift trend is 5.6° after the disruption, the slope of drift change prior to the disruption was 0.004° per second, and it took 25 seconds to recover from the disruption, an offset is calculated as follows. The goal is to set the target current drift to 4.3°+0.004°*25=4.4°. Since the predicted drift trend is 5.6° at the end of the disruption, it would take a −1.2° offset in the system for the predicted drift trend to match the goal current drift after the disruption.

When the magnetic field error bucket is not stable for the AG Heading at the time of the predicted drift being processed, the current drift replaces the predicted drift when calculating predicted trend. This process can be used to reduce the error further when calculating current drift, which is the result of the predicted trend line; this further reduces error and unnecessary fluctuations in the current drift, which is especially important since the current drift is used throughout the process of correcting for magnetic field error.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more micro-computers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general-purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general-purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the asso-ciated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure.

What is claimed is:

1. A method, comprising:

retrieving accelerometer and gyroscope (AG) heading data for an inertial measurement unit (IMU) of a device;

retrieving accelerometer, gyroscope, and magnetometer (AGM) heading data for the IMU; and processing the AG heading data and the AGM heading data to determine an overall heading of the device, including:

in accordance with a determination that the AG heading data indicates that the device is rotating below a threshold angular velocity, using the AGM heading data to correct drift in the AG heading data; and in accordance with a determination that AG heading data indicates the device is not rotating below the threshold angular velocity, forgoing using the AGM data to correct the drift in the AG heading data.

2. The method of claim 1 further comprising determining whether a tracking state exists using the AG heading data and the AGM heading data and calculating a magnetic field error if it is determined that the tracking state exists.

3. The method of claim 2 further comprising completing processing of the AG heading data and the AGM heading data if the tracking state does not exist.

4. The method of claim 2 further comprising calculating a drift output as a function of the magnetic field error.

5. The method of claim 4 further comprising completing processing of the AG heading data and the AGM heading data if the drift output does not exist.

6. The method of claim 2 further comprising calculating a magnetic field disruption if a drift output exists.

7. The method of claim 6 further comprising correcting the drift output if the magnetic field disruption exists.

8. The method of claim 6 further comprising correcting the AG heading data and the AGM heading data if the magnetic field disruption exists.

9. The method of claim 6 further comprising determining if a recovery state exists if the magnetic field disruption does not exist.

10. The method of claim 9 further comprising correcting the drift if the recovery state does not exist.

11. A system for processing data, comprising:

a processor operating under algorithmic control, the processor configured to perform the steps of:

retrieving accelerometer and gyroscope (AG) heading data for an inertial measurement unit (IMU) of a device;

retrieving accelerometer, gyroscope, and magnetometer (AGM) heading data for the IMU; and processing the AG heading data and the AGM heading data to determine an overall heading of the device, including:

in accordance with a determination that the AG heading data indicates that the device is rotating below a threshold angular velocity, using the AGM heading data to correct drift in the AG heading data; and in accordance with a determination that AG heading data indicates the device is not rotating below the threshold angular velocity, forgoing using the AGM data to correct the drift in the AG heading data.

12. The system of claim 11 wherein the processor is further configured to calculate the drift as a function of a magnetic field error.

13. The system of claim 12 wherein the processor is further configured to complete processing of the AG heading data and the AGM heading data if a drift output does not exist.

14. The system of claim 12 wherein the processor is further configured to calculate a magnetic field disruption if a drift output exists.

15. The system of claim 14 wherein the processor is further configured to correct the drift if the magnetic field disruption exists.

16. The system of claim 14 wherein the processor is further configured to correct the AG heading data and the AGM heading data if the magnetic field disruption exists.

17. The system of claim 14 wherein the processor is further configured to determine if a recovery state exists if the magnetic field disruption does not exist.

18. The system of claim 17 wherein the processor is further configured to correct the drift if the recovery state does not exist.

19. A non-transitory readable storage medium storing instructions, which, when executed by a system that includes one or more processors, causes the system to perform a set of operations comprising:

retrieving accelerometer and gyroscope (AG) heading data for an inertial measurement unit (IMU) of a device;

retrieving accelerometer, gyroscope, and magnetometer (AGM) heading data for the IMU; and processing the AG heading data and the AGM heading data to determine an overall heading of the device, including:

in accordance with a determination that the AG heading data indicates that the device is rotating below a threshold angular velocity, using the AGM heading data to correct drift in the AG heading data; and in accordance with a determination that AG heading data indicates the device is not rotating below the threshold angular velocity, forgoing using the AGM data to correct the drift in the AG heading data.

20. The system of claim 19 wherein the set of instructions further comprising calculating the drift as a function of a magnetic field error.

* * * * *